United States Patent
Wray

(10) Patent No.: US 10,188,954 B1
(45) Date of Patent: Jan. 29, 2019

(54) ARCADE GAME WITH INTEGRATED BEVERAGE SENSOR

(71) Applicant: Adam Wray, Tallmadge, OH (US)

(72) Inventor: Adam Wray, Tallmadge, OH (US)

(73) Assignee: Glitchbit LLC, Tallmadge, OH (US)

( * ) Notice: Subject to any disclaimer, the term of this patent is extended or adjusted under 35 U.S.C. 154(b) by 49 days.

(21) Appl. No.: 15/611,689

(22) Filed: Jun. 1, 2017

Related U.S. Application Data

(60) Provisional application No. 62/344,129, filed on Jun. 1, 2016.

(51) Int. Cl.
| | |
|---|---|
| A63F 9/24 | (2006.01) |
| A63F 13/00 | (2014.01) |
| G06F 17/00 | (2006.01) |
| G06F 19/00 | (2018.01) |
| A63F 13/90 | (2014.01) |
| A63F 13/40 | (2014.01) |
| A63F 13/48 | (2014.01) |
| A63F 13/70 | (2014.01) |
| A63F 13/847 | (2014.01) |
| A63F 9/00 | (2006.01) |
| G01F 23/00 | (2006.01) |
| G01F 23/02 | (2006.01) |
| G01F 23/20 | (2006.01) |
| B67D 99/00 | (2010.01) |

(52) U.S. Cl.
CPC .............. *A63F 13/90* (2014.09); *A63F 9/001* (2013.01); *A63F 13/40* (2014.09); *A63F 13/48* (2014.09); *A63F 13/70* (2014.09); *A63F 13/847* (2014.09); *B67D 99/00* (2013.01); *G01F 23/0007* (2013.01); *G01F 23/0015* (2013.01); *G01F 23/02* (2013.01); *G01F 23/205* (2013.01); *A63F 2009/0013* (2013.01); *A63F 2009/0053* (2013.01); *A63F 2009/0058* (2013.01)

(58) Field of Classification Search
USPC .............................. 463/5, 10, 20, 22, 25, 39
See application file for complete search history.

(56) References Cited

U.S. PATENT DOCUMENTS

| 8,146,921 B2 | 4/2012 | Lombardi |
| 8,341,669 B2 | 12/2012 | Lau |
| 2006/0052983 A1 | 3/2006 | Vock |

*Primary Examiner* — Adetokunbo O Torimiro
(74) *Attorney, Agent, or Firm* — Robert Knecht Schmidt

(57) ABSTRACT

An arcade game includes a beverage receptacle to hold a beverage container in an upright orientation and a beverage sensor to distinguish one or more beverage states and to communicate the distinguished one or more beverage states to the arcade game as gameplay activation inputs to the arcade game. The arcade game can also include features to proof the game against spillage of beverages onto and into the game cabinet, including gutters and a reservoir housing antimicrobial sponges. The system can compile usage data and deliver it to a business proprietor to provide customer consumption information.

20 Claims, 31 Drawing Sheets

ARCADE GAME WITH INTEGRATED BEVERAGE SENSOR

CROSS-REFERENCE TO RELATED APPLICATION

This application claims priority to, and incorporates by reference, U.S. provisional patent application No. 62/344,129, filed Jun. 1, 2016.

TECHNICAL FIELD

The present disclosure relates to electronic arcade games, video games, and systems for entertainment.

BACKGROUND

Businesses that serve drinks, such as bars and restaurants, often have video games available for patrons. Such video games are often monetized, if at all, by requiring a player to deposit money, e.g., coins, tokens or an account card, to enable game play.

SUMMARY

In one example, there is provided an arcade game comprising one or more processors for executing an arcade game having one or more participants; a visual display screen; and a countertop control panel, the countertop control panel comprising at least one game input by which a participant can control the arcade game and at least one beverage receptacle to hold a beverage container in an upright orientation; and at least one beverage sensor to distinguish one or more beverage states and to communicate the distinguished one or more beverage states to the arcade game as gameplay activation inputs to the arcade game. The one or more processors can be configured to enable and disable control inputs of a player of the arcade game based on input from the beverage sensor. For example, the one or more processors can be configured to disable the control inputs of the player of the arcade game when the beverage receptacle is empty and when a beverage container received by the beverage receptacle is empty. The arcade game can further comprise at least one gutter to convey liquid from the beverage receptacle to a reservoir.

In another example, there is provided a device comprising a beverage receptacle adapted to hold a beverage container in an upright orientation; a beverage sensor operatively coupled to the beverage receptacle and adapted to distinguishably respond to states of the beverage receptacle including empty, non-empty but containing an empty beverage container, and non-empty and containing a non-empty beverage container; and an output of the beverage sensor adapted to electronically communicate responses of the beverage sensor to an input of a video game controller.

In yet another example, there is provided a method comprising accepting a non-empty beverage container into a receptacle associated with a beverage sensor to activate electronic gameplay control; as part of electronic gameplay, instructing a participant to consume beverage from the beverage container; detecting at least one beverage state with the beverage sensor; communicating the at least one beverage state to a video game controller; and disabling electronic gameplay control for the participant based on the detected beverage state indicating the absence of a non-empty beverage container.

DETAILED DESCRIPTION

Figure 1:
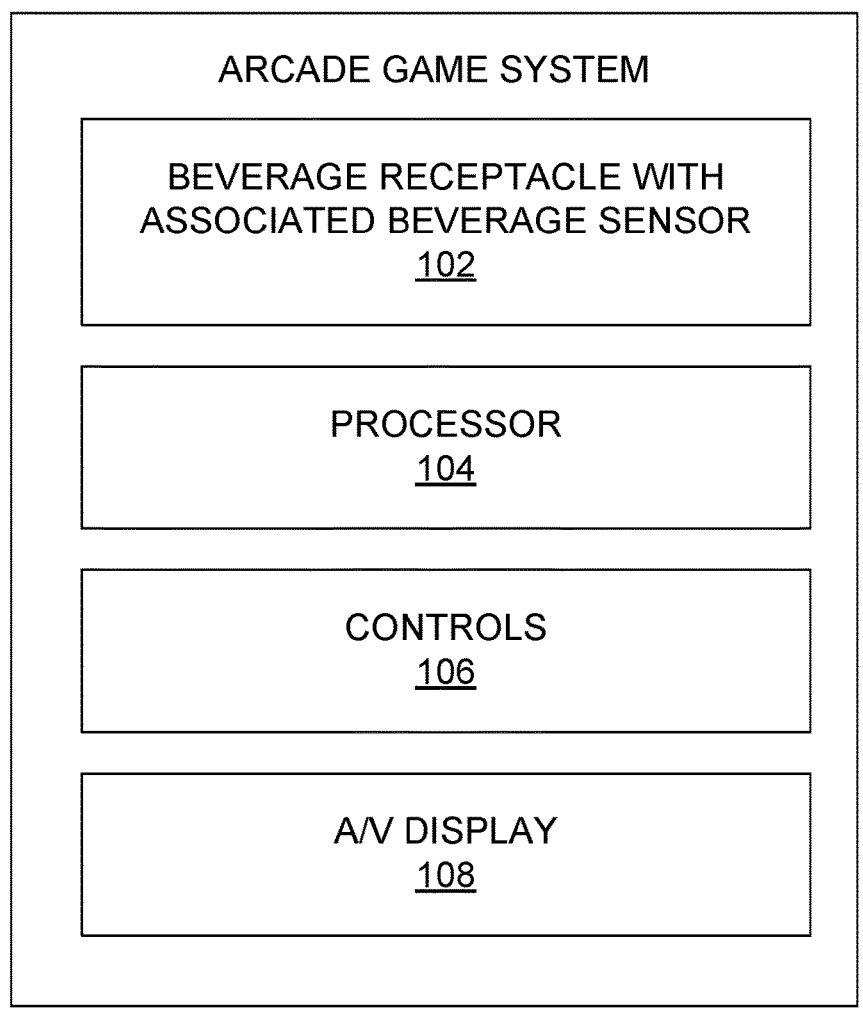
FIG. 1 is a system diagram showing the core components of an example arcade game system.

Businesses that serve drinks and which have video games available for patrons typically make significantly more from beverage service than from the video games. One way in which such a business may enhance profitability is to require a player to insert into an arcade machine a beverage, rather than money, so that the player may continue playing for as long as the player has a non-empty beverage container. To this end, the present disclosure describes arcade game machines and associated methods that incorporate one or more beverage receptacles, each having an associated beverage sensor, into an arcade game machine as a control input to a video game controller. In various examples, a receptacle/sensor can act not only as a coin or token to grant access to a game but further as a control input to control vital game functions. Consequently, the systems and methods described herein not only enhance customer experience by providing a fun electronic diversion, they also enhance business sales by encouraging beverage purchases and providing data about customer consumption to business proprietors.

Different examples of systems described herein may comprise an integrated beverage receptacle, beverage sensor, and video game. More specifically, the video game may receive a signal from the beverage sensor indicating the state of the beverage receptacle as empty or non-empty. Additionally, examples may distinguish between non-empty states where the beverage receptacle contains, i.e. receives, a non-empty beverage container, and an empty beverage container. Accordingly, an example may enable game play in response to a user depositing, e.g. a bottle of beer, in a beverage in the beverage receptacle, and it may disable game play when the beer bottle is empty. Alternatively, or additionally, examples may temporarily disable game play until a game controller receives a signal from a beverage sensor that a non-empty beverage container has been removed and then replaced, suggesting that the player has taken a drink. As used herein, the term "sensored beverage receptacle" means a beverage receptacle having at least one sensor associated therewith, which sensor may be affixed to or integrated as part of the receptacle or may merely be matched with the receptacle such that there is a one-to-one correspondence between sensors and receptacles in systems having multiple of each.

As used herein, the term "player," as in "game player," refers to a human participant of a video game, while the term "character" refers to a graphical game element responsive to player inputs to a video game controller. Thus a character may correspond to a player in that the player's input controls to a gaming console control the character, and the character may be enabled or disabled according to methods described herein. In one example, a character may be disabled when the corresponding beverage receptacle is empty or when the beverage receptacle contains an empty beverage container. Accordingly, in order for a player to play the game, the player must acquire a non-empty beverage container. Some examples may additionally enable and disable a character in response to events occurring the game, e.g., completion or non-completion of a game objective or other required task. Furthermore, such examples may require the player to remove and replace a non-empty beverage container belonging to the player in order to re-enable a character corresponding to the player, or otherwise to proceed with a game.

The term "video game controller", as used herein, may include a variety of different devices. In general, a video game controller is any device that enables, disables, or effects game play. For example, a video game may be enabled when a state of one component of the controller causes another component(s) to accept user input and communicate the input to a computer to effect game play, e.g. by moving graphical game pieces. Conversely, a video game may be disabled when a state of one component of the controller causes another component(s) to reject user input or otherwise not communicate it. Notwithstanding the foregoing description, while components for enabling and disabling a video game may in some sense be said to be part of, or a component of, a video game controller, the present disclosure distinguishes between a video game controller and the components that produce signals for enabling and disabling game play. Accordingly, the beverage receptacle and beverage sensor are considered herein to be distinct from the video game controller.

The beverage receptacle may use weight, pressure, switch, strain gauge, proximity, Hall effect, barcode, temperature, sonar or optical sensors to determine the brand, value or source of an inserted beverage. These sensors can be installed directly on or close to the beverage receptacle to make their respective measurements or determinations.

FIG. 1 is a system diagram showing the core components of an example arcade game system 100. System 100 can include a beverage receptacle having associated therewith an associated beverage sensor 102. Beverage sensor 102 can detect and report, via at least one output, the presence of a non-empty beverage container. In some examples, beverage sensor 102 can further discriminate between various levels of beverage container fullness or emptiness (i.e., levels of consumption of the beverage) and/or can detect or measure various other beverage properties, such as beverage type (e.g., water vs. soft drink vs. alcoholic beverage), container type (e.g., glass vs. bottle vs. can), beverage origin (e.g., purchased on the premises vs. brought from outside the premises), beverage price or value, or beverage age since serving (e.g., by measuring temperature or level of carbonation evanescence). The various beverage properties may be measured or detected with an appropriate sensor or detector or may be inferred based on measurements of related properties.

System 100 can further include at least one processor or CPU 104 that acts as a video game controller to accept control inputs, including from sensor 102 and controls 106, and produce outputs, e.g., game graphics, sound effects, and music, to at least one visual or audiovisual display 108, such as a color display monitor.

Figure 2:
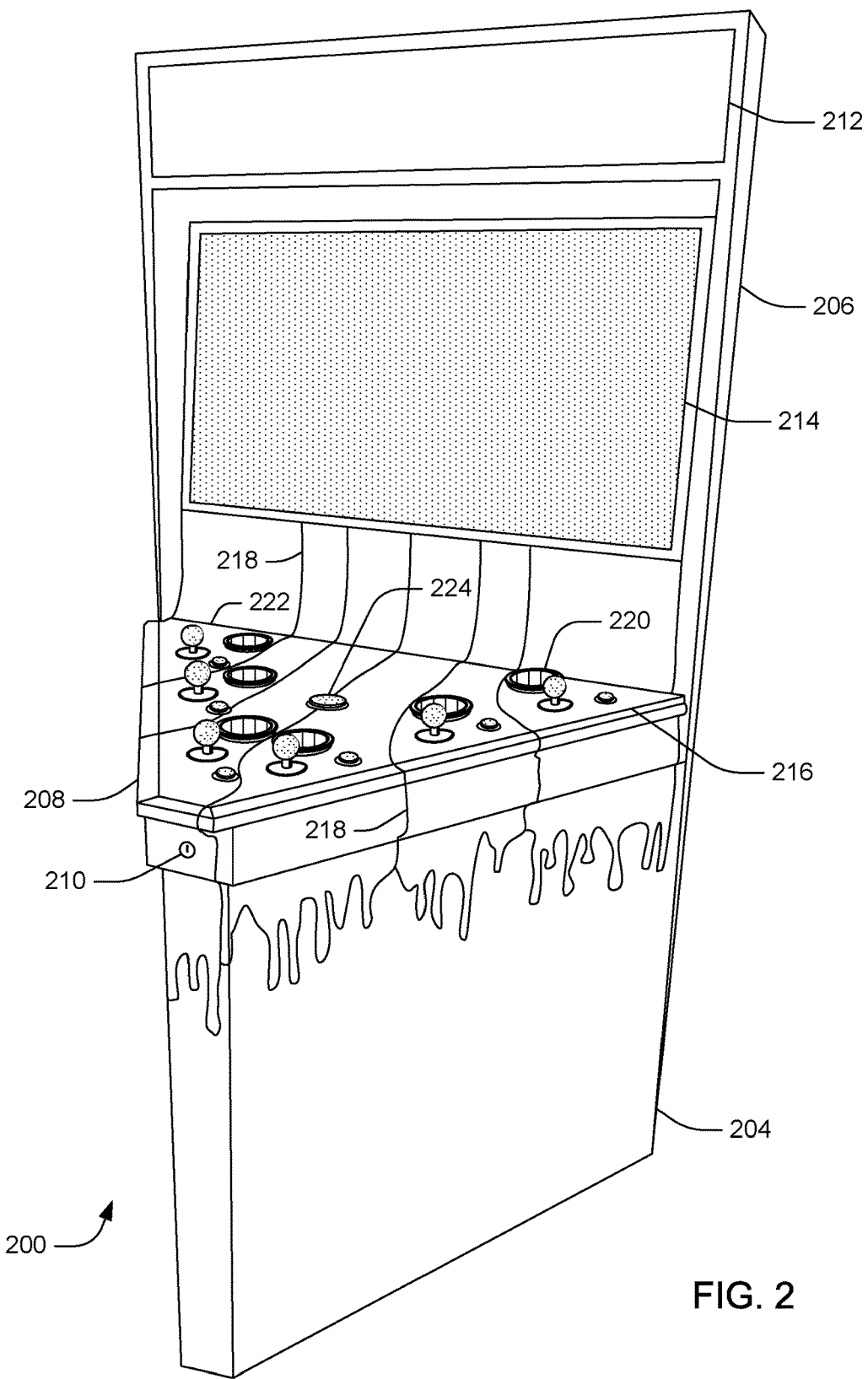
FIG. 2 is a three-quarters perspective view of the exterior of an example arcade game machine.
Figure 4:
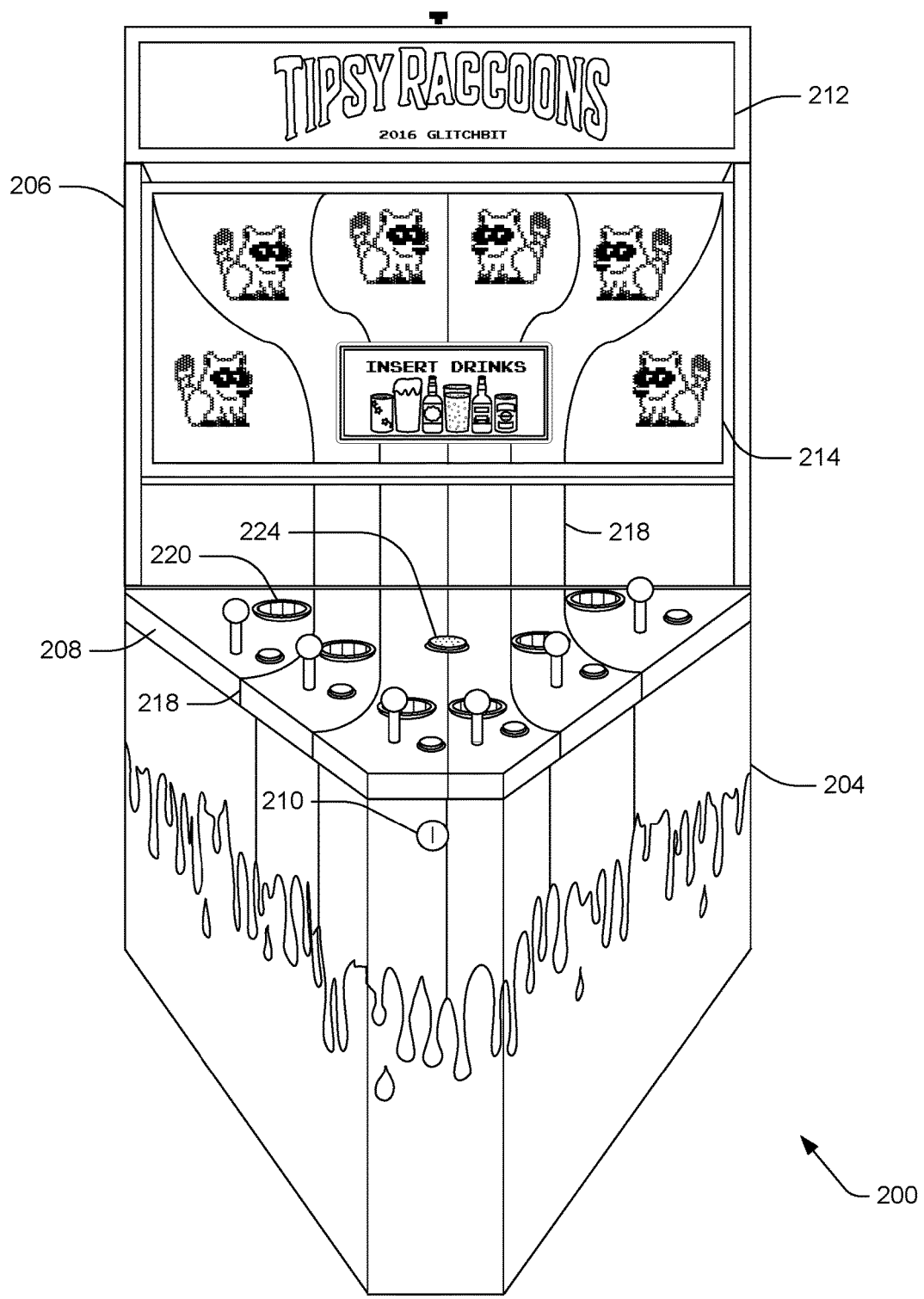
FIG. 4 is a front perspective view of the exterior of an example arcade game machine.

FIG. 2 is a three-quarters perspective view of the exterior of an example arcade game machine 200 with a number of integrated sensored beverage receptacles 220, while FIG. 4 provides a front perspective view of machine 200. In the illustrated example, machine 200 has six such receptacles 220. Arcade machine 200 has a cabinet having a base or housing body 204, topped by a control panel 208, a bezel 206, and a marquee 212. Bezel 214 can secure and aesthetically frame display monitor 214. In some examples, marquee 212 can house a static sign, which in some examples can be backlit, to indicate, e.g., the name of the game offered by machine 200 and its maker or origin. In other examples, marquee 212 can house a dynamic display, e.g., a color display screen, that can display different names of different games depending, e.g., on a selectable or rotating set of offerings. The cabinet can be powered, for example, via a standard A/C wall plug (not shown).

Control panel 208 can include a number of controllers that can provide inputs to the video game, e.g., joysticks, buttons, trackballs, keyboards, microphones, guns, steering wheels, throttle levers, pilot yokes, etc. In some examples the system 200 may also provide one or more pedals as controls. Control panel 208 can also include a number of sensored beverage receptacles 220. In some examples, control panel 208 is substantially level so that beverages may be placed on it without sliding off. In the illustrated example, control panel 208 is connected to housing 204 by hinge 222 at its back edge so that it can be lifted to expose the underside of controls and beverage sensors for maintenance and diagnostic purposes. A locking mechanism 210 (e.g., a key lock) can secure panel 208 limiting underside access to restricted personnel.

Figure 3:
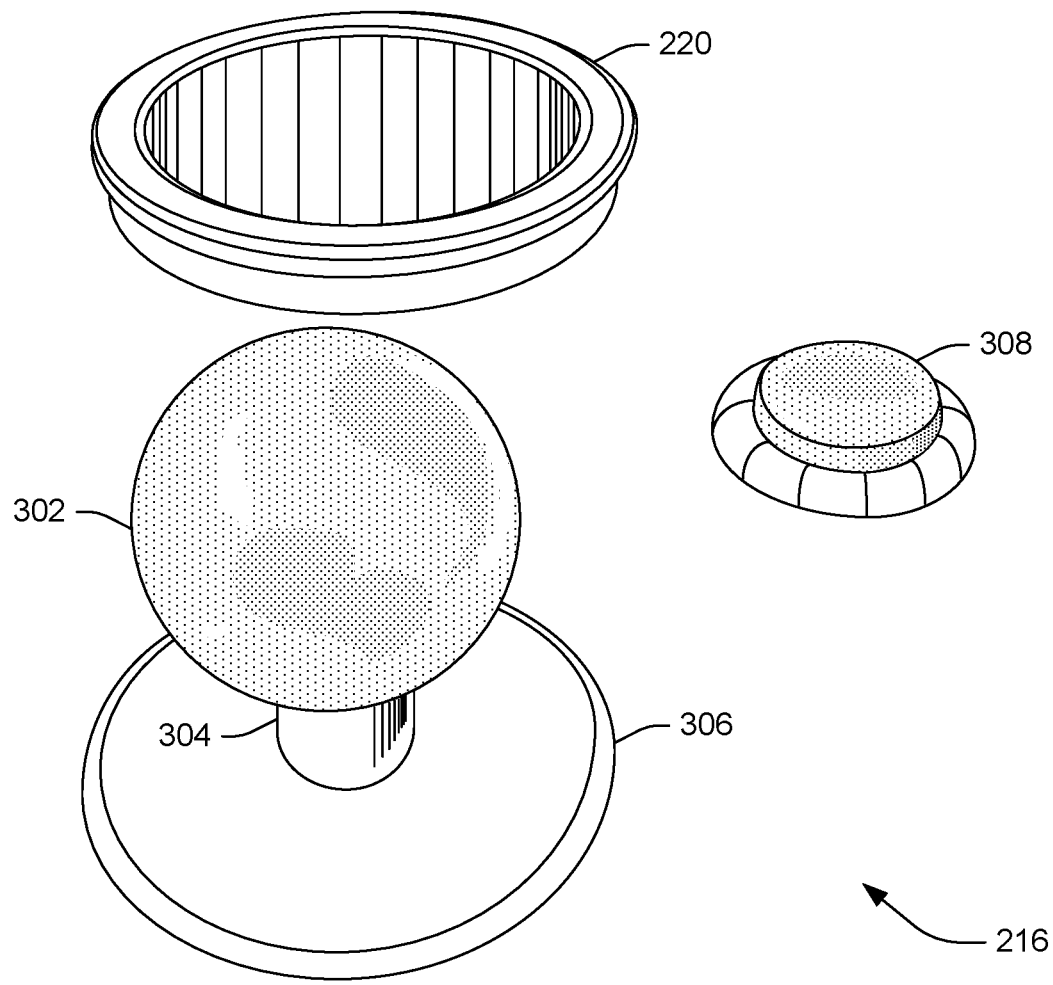
FIG. 3 is a perspective view of an example arcade game control station with sensored beverage receptacle.

Control panel 208 can be visually divided into individual player stations 216 by, for example, station dividing lines 218 and/or arrows (not shown in FIGS. 2 and 4, but see 606 in FIG. 6) pointing outward to the intended positions of the various players. The stations can be color-coded and/or be given any type of distinctive design to reduce the confusion between players of their respective controls and beverages. FIG. 3 shows an example station 216 having a beverage receptacle 220, button 308, and a joystick made of knob 302, stem 304, and cover plate 306. In addition to any controls associated with any one station, machine 200 may also incorporate common controls, e.g., a start button 224.

Figure 5A:
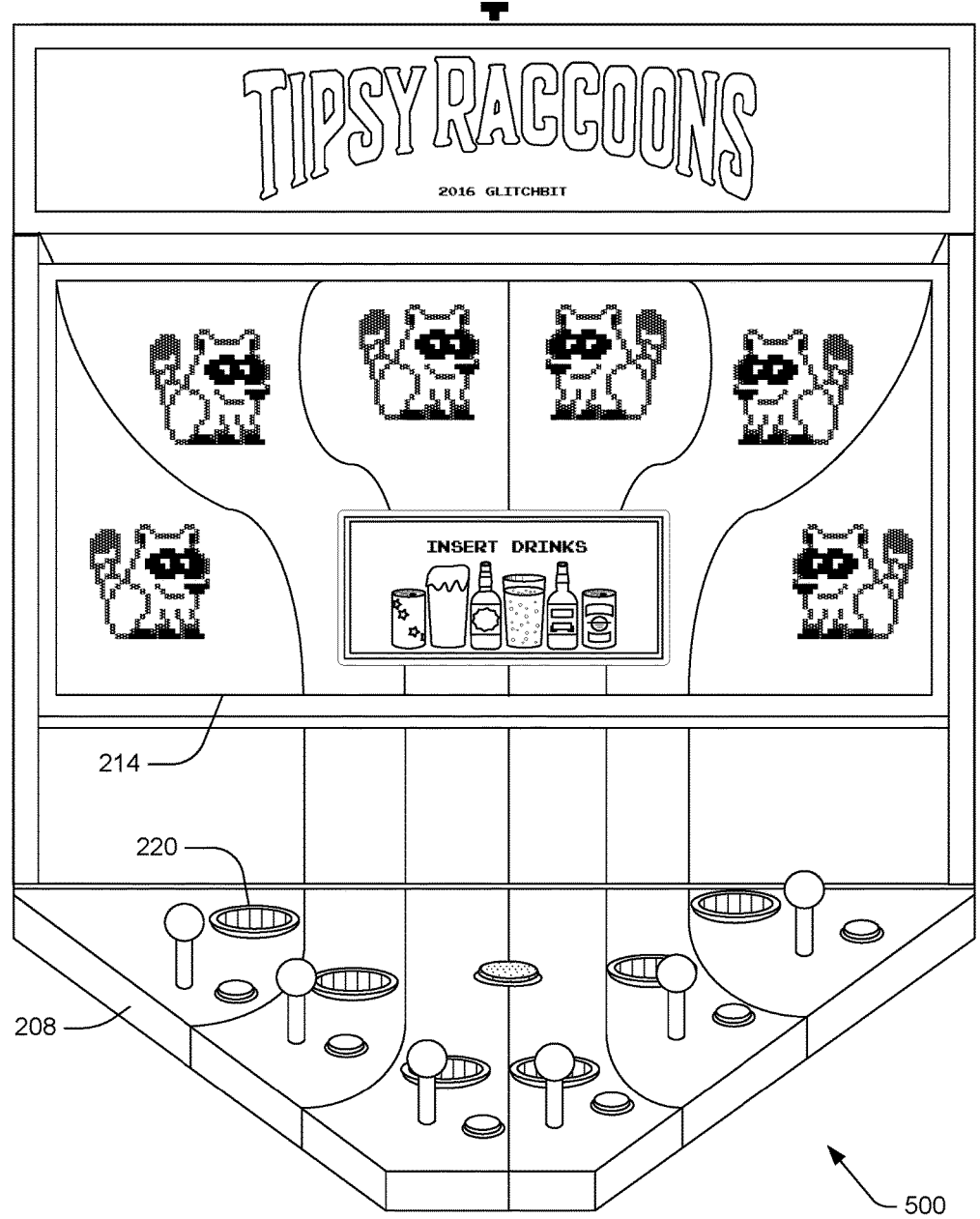
FIGS. 5A-5H illustrate example game states arising as a result of sensed inputs from one or more beverage sensors and/or controlled by sensored beverage receptacles.
Figure 5B:
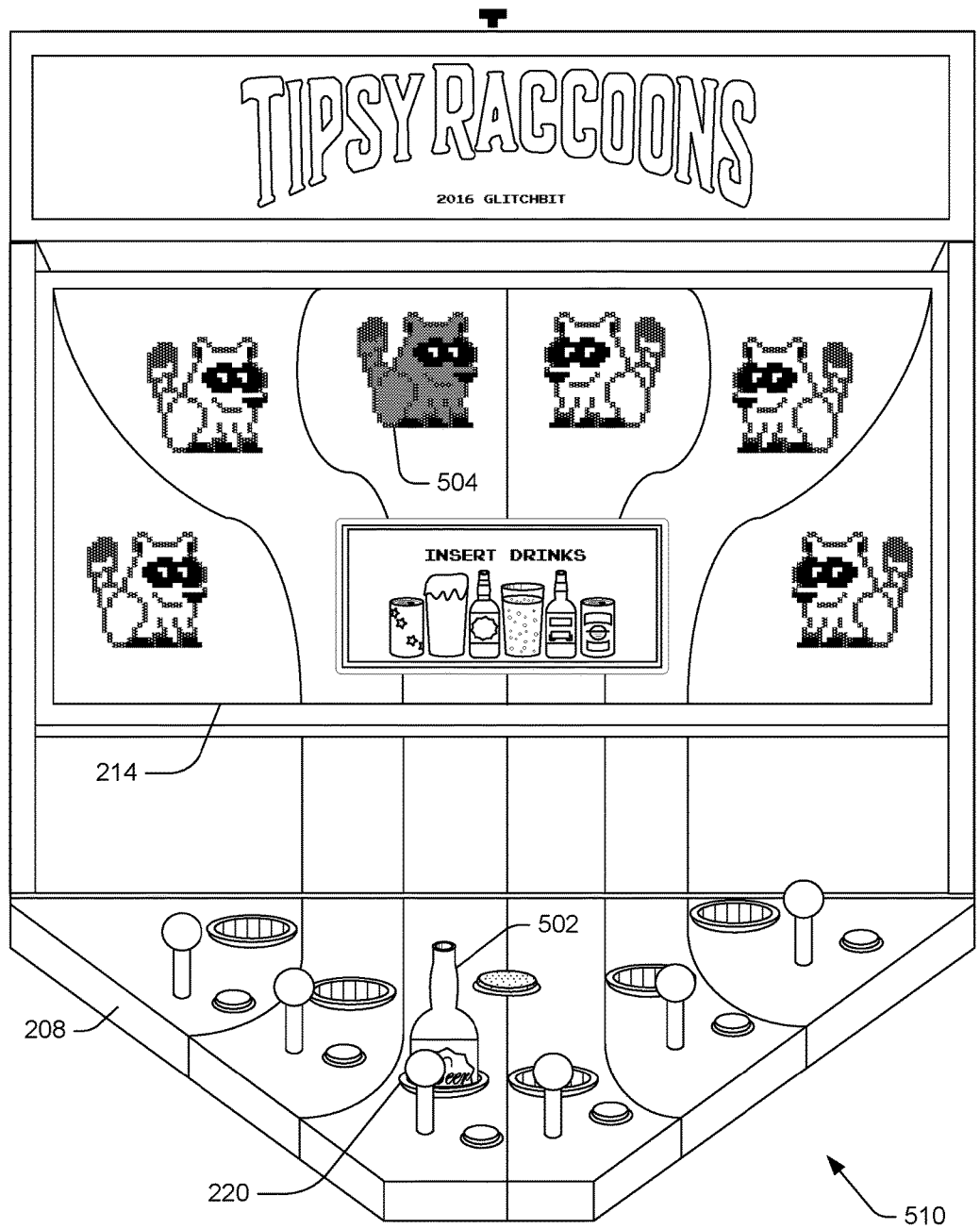
Figure 5C:
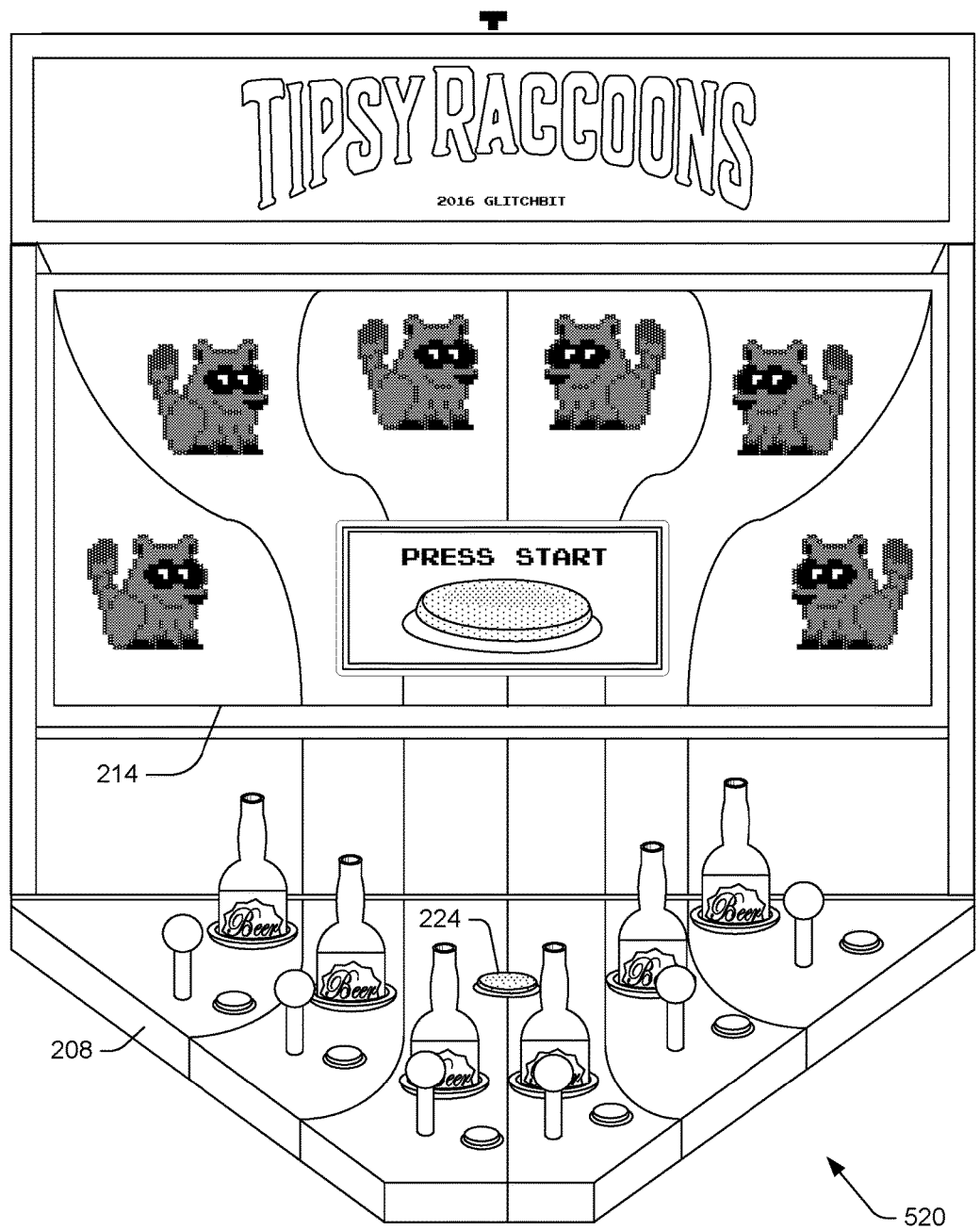

FIGS. 5A-5H illustrate various game states that may arise as a result of sensed inputs from the one or more beverage sensors and/or be controlled by the sensored beverage receptacles 220 embedded in control panel 208. Initial state 500 in FIG. 5A shows screen 214 displaying a directive to "insert drinks" and may be accompanied, for example, by a demonstrative animation. As shown by first player activation state 510 in FIG. 5B, a non-empty beer bottle 502 inserted into receptacle 220, and thereby sensed by the game via a beverage sensor, activates the game for the corresponding player, as indicated on screen 214 by a change to corresponding character 504, which can include a change in brightness, contrast, intensity, or color of character 504, and/or an animation change in character 504 or a sound effect cue that may appear to emanate from character 504. Following the "check-in" of this player, after a certain time or in response to an input, the game may begin, or in some examples, the game may wait for additional players to join the game before beginning gameplay. Full game state 520 in FIG. 5C shows that all players that can be accommodated by game (i.e., in the illustrated example, all six players) have joined by insertion of non-empty beverage containers, causing all on-screen characters to become illuminated or otherwise indicated as active, and causing screen 214 to issue a new directive to press start button 224 to begin the game.

Figure 5D:
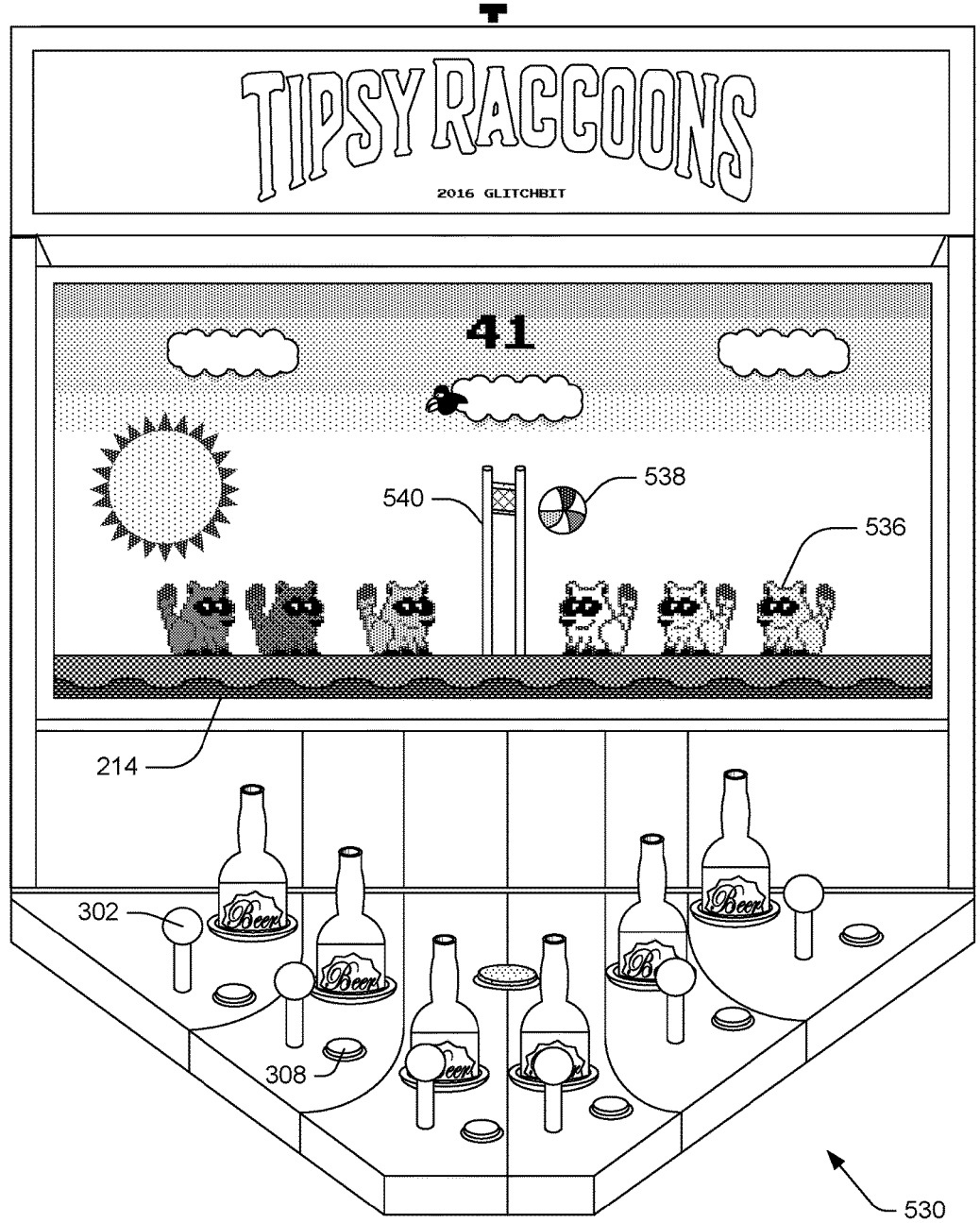
Figure 5E:
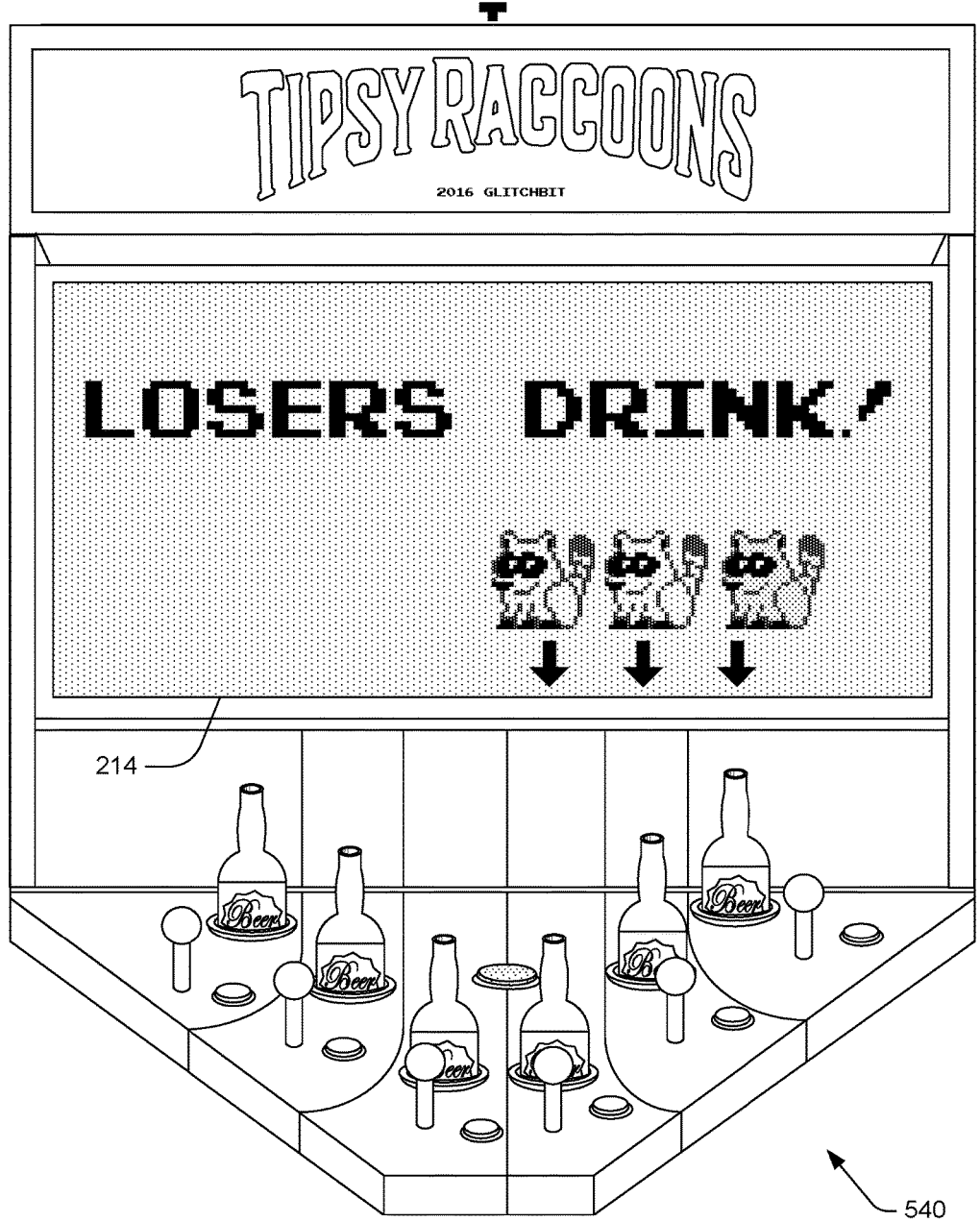
Figure 5F:
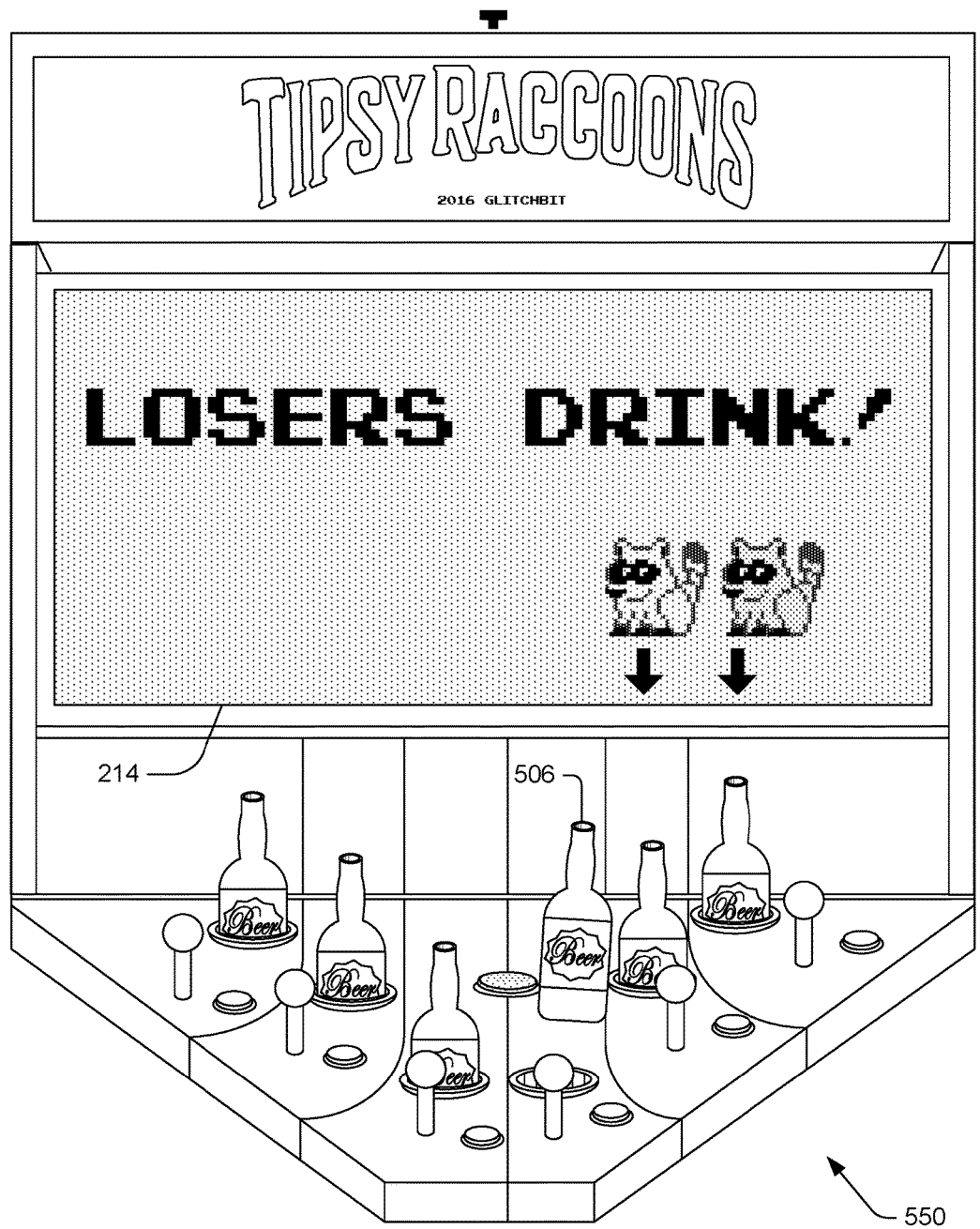

Gameplay can involve any number of arcade-style games of various genres, e.g., racing, puzzle, platform, side-scroller, shoot-'em-up, etc. Games can be cooperative between players, or competitive, or both, as when players are divided into teams. As an example, players can control on-screen characters that can, for example, match in color, pattern, or in some other way to a designation provided by the design of respective stations on control panel 208. For example, joystick 302 can be used to navigate characters and one or more buttons 308 can be used to cause characters to jump, shoot projectiles, or perform other actions. Gameplay state 530 shown in FIG. 5D illustrates one example game on screen 214, a team volleyball game, in which characters 536 are manipulated to prevent a ball 538 from falling on a home side of a net 540 and to cause it to fall on opponents' side. At the instant illustrated, ball 538 is falling onto the right side of the court, causing the players associated with the right-side characters to lose the game. As shown by game completion state 540 in FIG. 5E, screen 214 prompts the losing players to "drink." Compliant player state 550 in FIG. 5F shows that one player has removed beer bottle 506 from its receptacle in that player's station, causing the game to remove the corresponding prompt character from screen 214.

The game can be programmed to sense that a sip has been taken (e.g., that the liquid in the beverage container 506 is reduced in weight, level, etc.), and to persist in requiring a player to drink until such beverage amount reduction is sensed. Alternatively, in some examples, the game may be programmed to consider that mere removal and replacement of container 506 suffices to qualify as the required "drink" instructed by the game. In any case, once all "loser" players have complied, the game may resume or a new, possibly different game may begin.

Figure 5G:
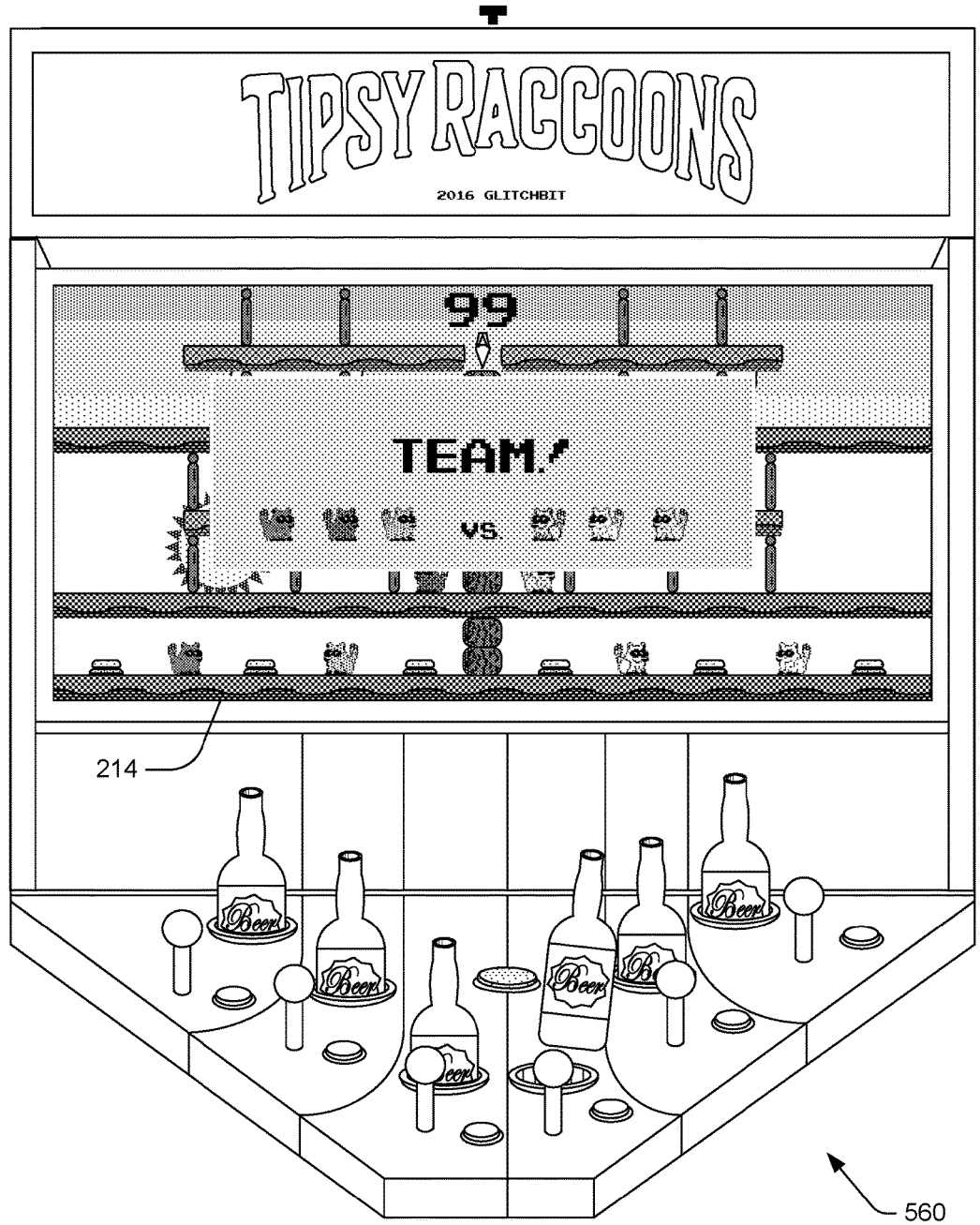
Figure 5H:
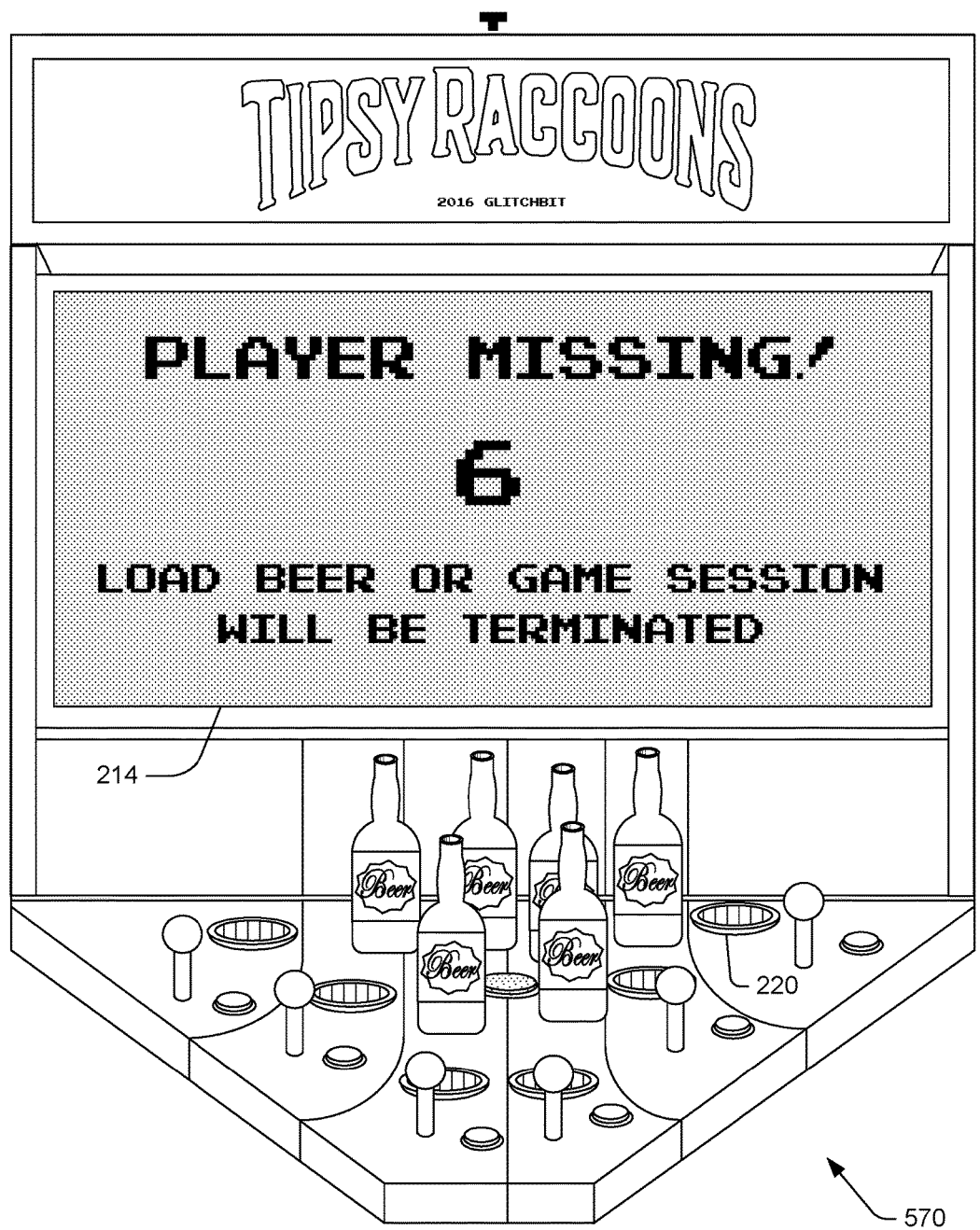

FIG. 5G illustrates the start of a new game state 560, another cooperative/competitive game. As shown, the game can be programmed to disregard temporary removal of one or more beverages from the receptacles to allow players to drink between games or mid-game without penalty. However, as shown by no-player state 570 in FIG. 5H, the game may also be programmed to pause, and eventually to terminate (e.g., after a countdown), a game when it appears that all players have run out of beverage or abandoned the game by virtue of insufficient beverage being sensed in a threshold number of beverage receptacles. The illustrated example shows all beverages having been removed from their receptacles, but for some games that require multiple players, the game may be programmed to pause and/or terminate when an insufficient number of players are active, or have been inactive for long enough time. For example, the game may be programmed such that removal of a beverage from a receptacle for 10 seconds without returning a non-empty beverage container to the receptacle triggers deactivation of player control for that player, while absence of a non-empty beverage container from the receptacle for one minute triggers a "check-out" of the player, and an absence of a quorum of active players for 30 seconds terminates the game.

Figure 6:
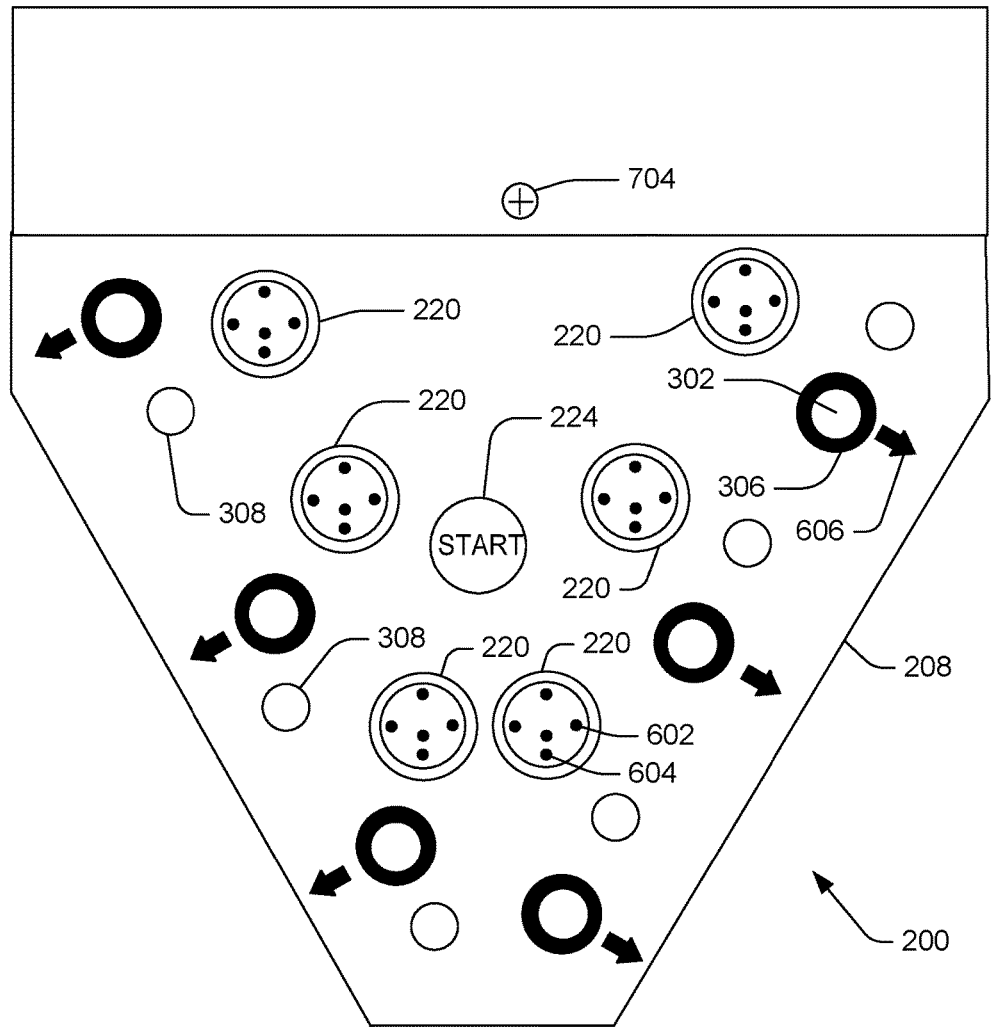
FIG. 6 is a top-view diagram of an example arcade game system showing an example relative placement of game controls.

FIG. 6 is a top-view diagram of arcade game system 200 showing an example relative placement of game controls 302, 308 and beverage receptacles 220 in control panel 208. Arrows 606 on the control panel 208 point to recommended player placement around the machine 200 and help associate each player with his or her controls 302, 308. From this view, receptacle drain holes 602 (as illustrated, three per receptacle) and receptacle attachment points 604 (as illustrated, two per receptacle, spaced closely together) at the bottoms of each receptacle 202 are visible. The drain holes 602 permit spilled liquid to drain from receptacles 220, while the attachment points 604 permit the receptacles to be mounted other than by a lip or rim of a receptacle resting directly against panel 208, which attachment could prevent or distort a measurement by an associated beverage sensor.

Figure 7:
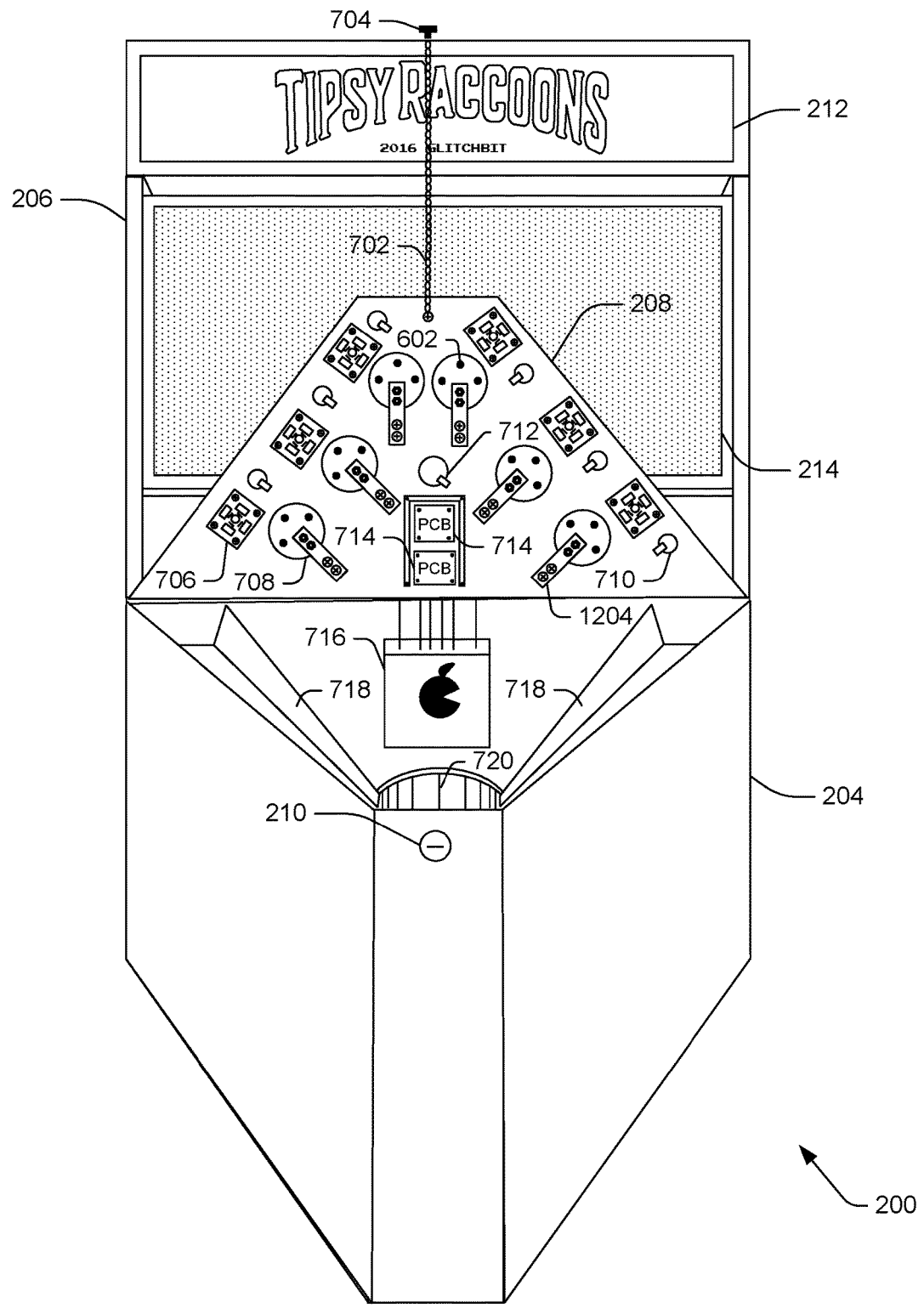
FIG. 7 is a front perspective illustration of an example arcade game system.

FIG. 7 is a front perspective illustration of arcade game system 200 during maintenance. Locking mechanism 210 can be unlocked to permit the raise of the control panel 208 on its hinge. A hanging connector 208 (e.g., chain, wire, or string) affixed at one end to the front of the underside of the panel 208 can be attached to an attachment point 704 (e.g., hook, eyelet, or screw head) at the top of the cabinet to secure panel 208 in an open position. Game controls (e.g., joysticks and buttons) can be based on pressure switches of the type commonly found in arcade controls, which provide the benefits of simplicity, reliability and ruggedness. For example, pressure switches can survive even full liquid immersion. As illustrated, joystick underside 706 can provide access to the four pressure switches belonging to each joystick, while control button undersides 710 and start button underside 712 can provide access to the single pressure switch each button.

Although the arrangement of components on the underside of panel 208 is illustrated in FIG. 7, the connections between them are omitted for clarity. Each of the control elements 706, 708, 710, 712 can be connected (e.g., by conductive wires) to one of one or more controllers on printed circuit boards (PCBs) 714 that can accept analog signal inputs and can provide, e.g., digital signal outputs to processor 716 via, e.g., a USB connection. Signal conditioning circuitry (e.g., filters and/or amplifiers) (not shown) can be placed in the signal paths between the control elements 706, 708, 710, 712 and the PCBs 714 to which they are respectively connected to provide cleaner or larger-amplitude signals to the PCBs 714 prior to digitization. As an example, a SparkFun Load Cell Amplifier can serve as an intermediary between a load cell 1204 of beverage sensor 708 and the PCB 714 to which it is connected.

Processor 716 can include a microprocessor to process game inputs and run game functions. Processor 716 can be, for example, a Mini-ITX PC, such as a Mac Mini manufactured by Apple Inc., which has a form factor of only 7.7 inches square by 1.4 inches tall, and provides the requisite USB inputs and HDMI audiovisual outputs. Processor 716 can store game data and programming, including graphics, sounds effects, music, level designs, and game logic, in one or more non-transitory memories and can thus control a game given inputs from game controls and provide suitable outputs to a visual or audiovisual display via, e.g., an HDMI connector. Processor 716 can also provide operational electric power (e.g., at 5 volts) to PCBs 714 via, e.g., the USB connection between them.

In some examples, the two PCBs 714 can include a first PCB that communicates inputs from the buttons 710 and joysticks 706 to processor 716 and a second PCB that communicates inputs from players' beverage sensors 708 to processor 716. As examples, the PCB that handles button, joystick, or other control device inputs can be an Ultimarc I-PAC, while the PCB that handles beverage sensor inputs can be an Arduino Uno or a Sparkfun Redboard. Each PCB 714 can be housed in a polymer cover or box to protect the electronic components from liquids that may spill over the arcade's control panel 208.

Figure 8:
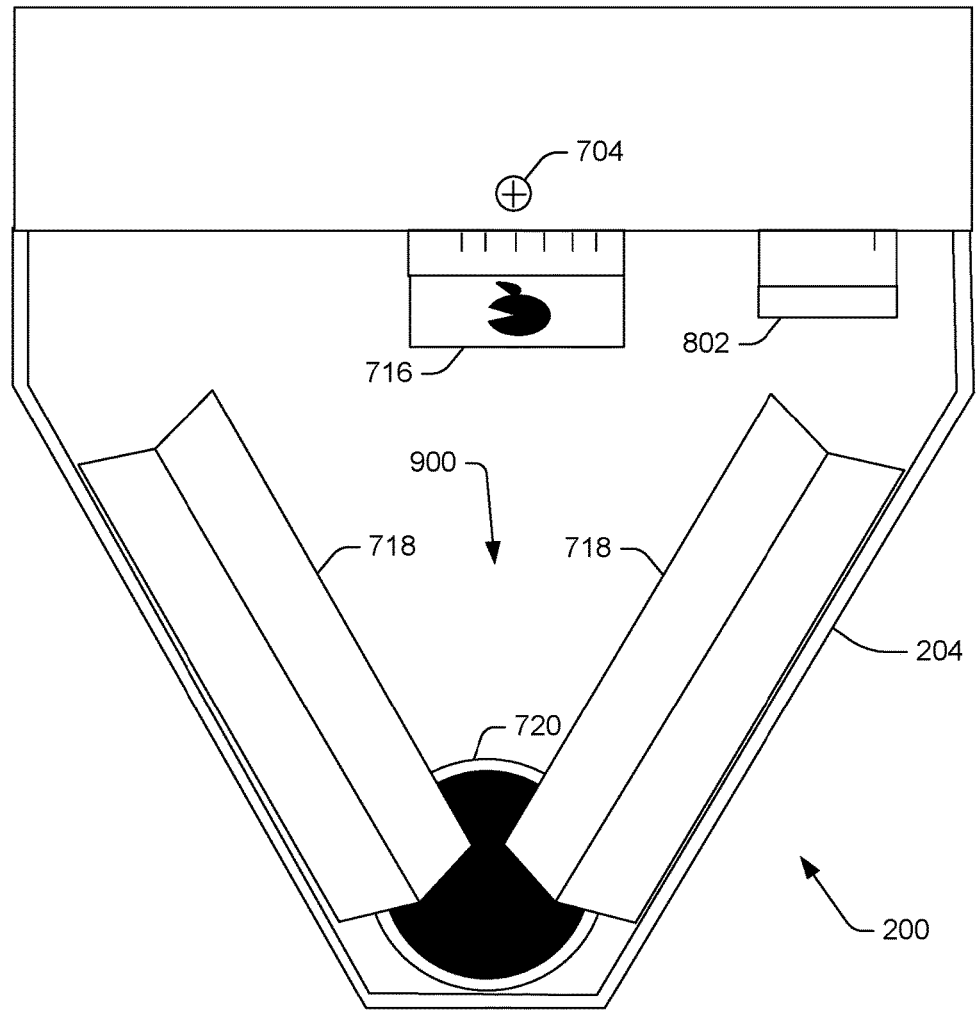
FIG. 8 is a top view of an opened cabinet body of an example arcade game system.
Figure 9A:
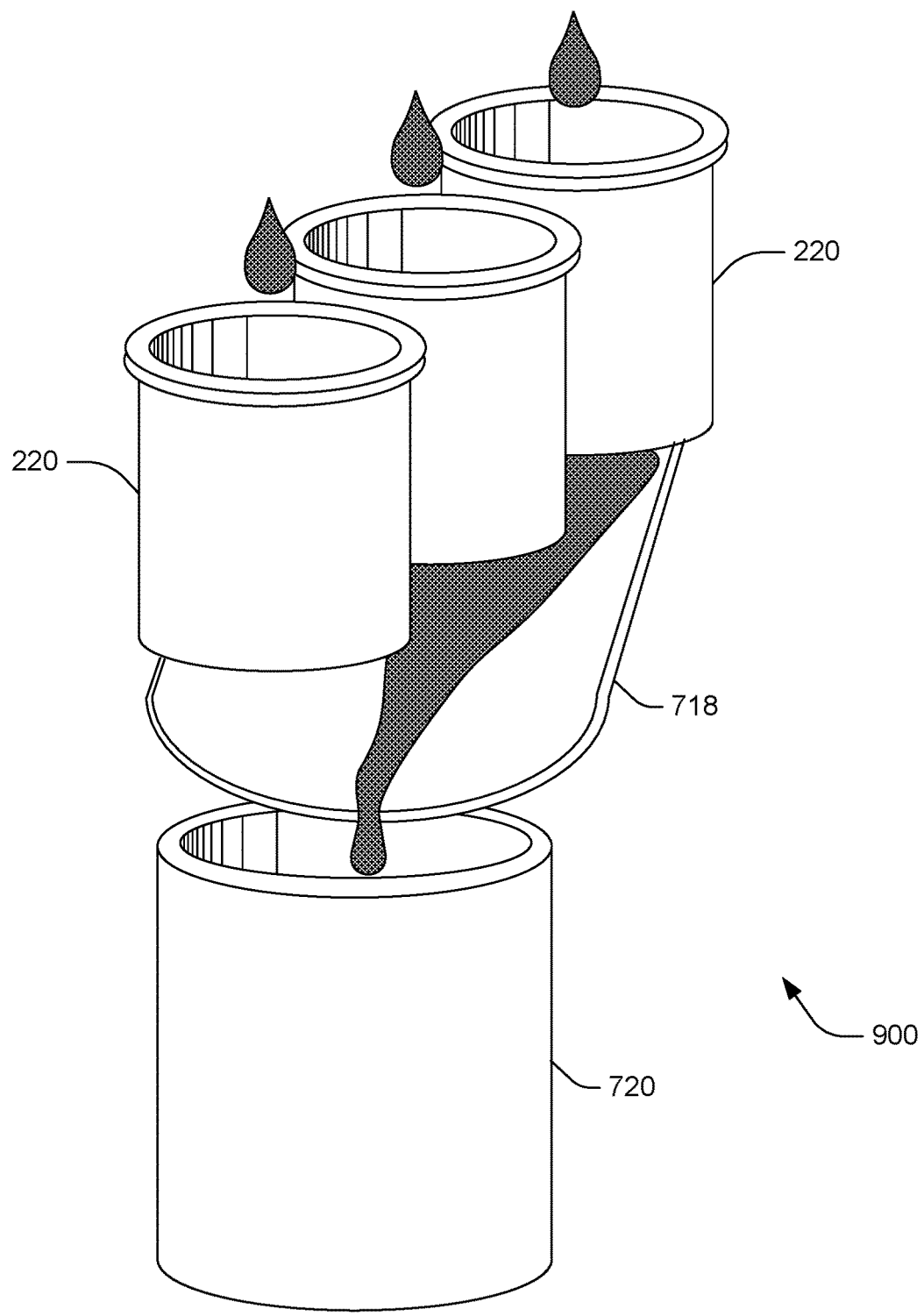
FIGS. 9A-B are different views of an example gutter system for use in an example arcade game system.
Figure 9B:
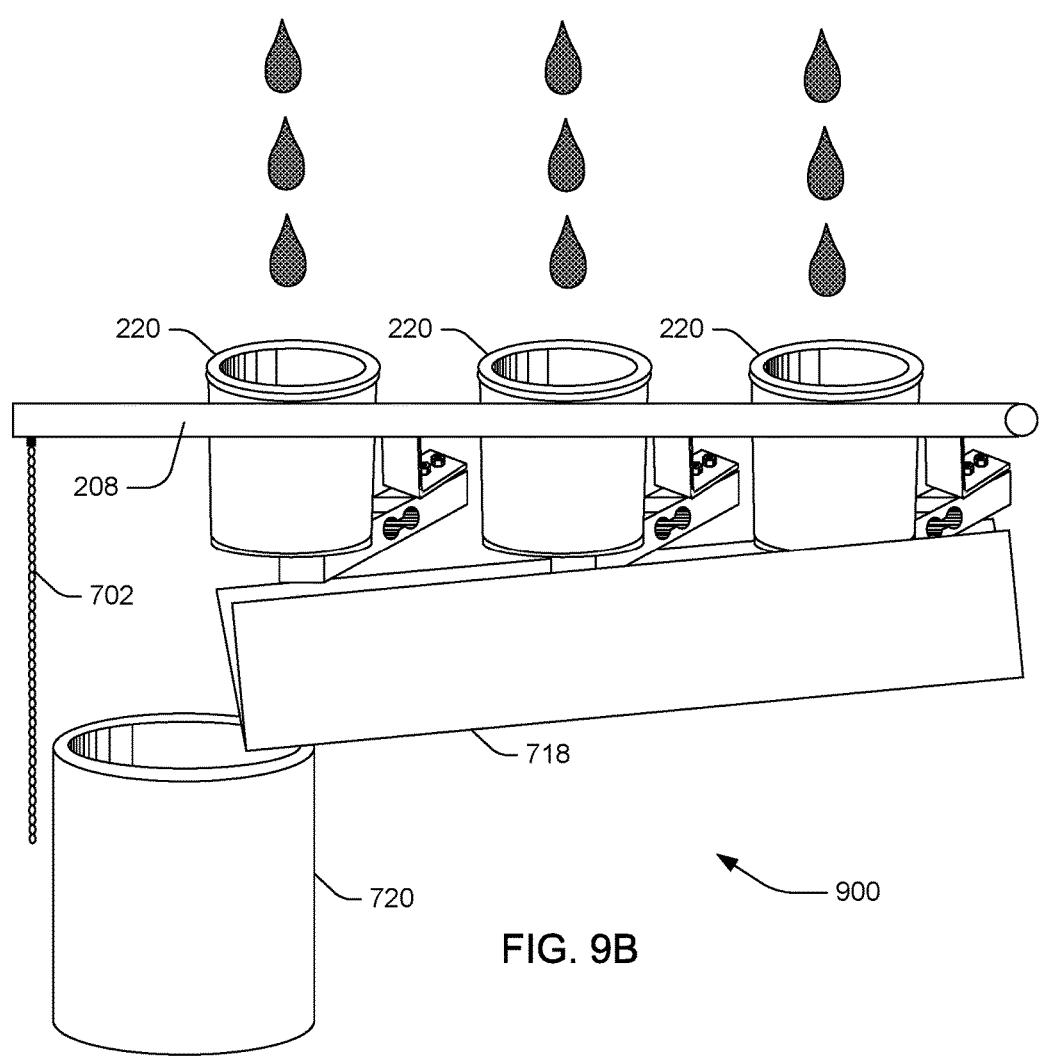

FIG. 7 shows that system 200 can also have a gutter system 900 that includes, in the illustrated example, two gutters 718 arranged underneath the rows of beverage receptacles 220/708. Each gutter 718 can flow into a containment reservoir 720 which can be sized large enough (e.g., to hold one or several gallons) such that it can hold a large volume of beverage fluid that may be spilled into receptacles 220, which fluid drains through holes 602 into gutters 718 and finally into reservoir 720. In some examples, reservoir 720 itself may be provided with a hose or pipe (not shown) to drain out of system 220 into, e.g., a floor drain (not shown) or sewer line connection (not shown). In other examples, however, such additional drainage may not be convenient, and thus, reservoir 720 can be sized large enough to all fluid that may be spilled in the course of an activity period until it can evaporate. FIG. 8 provides an overhead view of gutters 718 and reservoir 720 within cabinet body 204. FIGS. 9A and 9B provide, respectively, a front perspective view and a side perspective view of the example gutter system 900. Alternatively or in addition to the illustrated gutters, hoses or pipes (not shown) can direct liquid from receptacles 220 to reservoir 720 or to an external drain.

Figure 10:
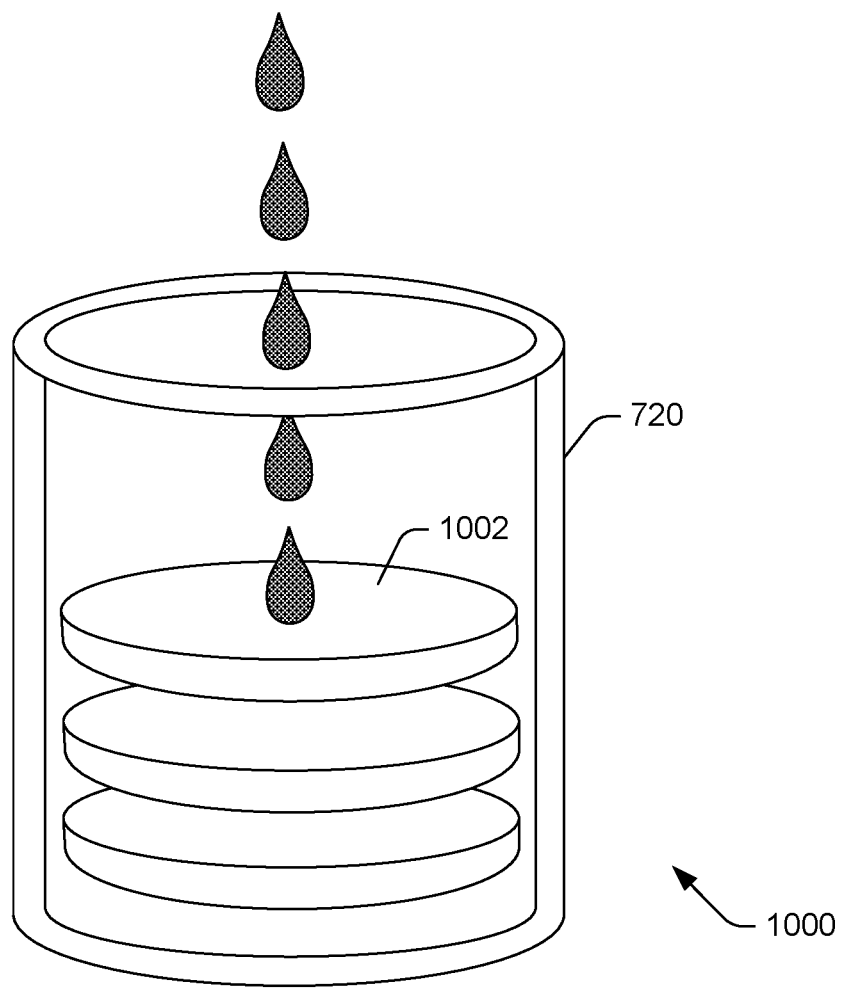
FIG. 10 is a cutaway view of an example spilled fluid collection reservoir with antimicrobial sponges.

As shown in the cutaway view of reservoir 720 in FIG. 10, reservoir 720 for collecting leaked fluid can be outfitted with one or more sponges 1002, which can be antimicrobial sponges capable of arresting the growth of odor-causing bacteria as may be produced, for example, by the decomposition of hops in spilled beer. Sponges 1002 can thus absorb spilled fluid and prevent the development of bad odors until such time as spilled fluid has evaporated and the sponges 1002 again become dry. As shown, sponges 1002 can be arranged as a stack. The outer surface of arcade machine 200, and particularly its control panel 208, can be coated in a water resistant paint or shell, e.g., a vinyl wrap, which can be printed with an industrial inkjet printer, cut to shape, and adhered to the arcade machine 200 with a spray adhesive. On the inside of the cabinet 204, where any wood may be exposed, the cabinet 204 may be coated with latex or a latex-based coating to prevent the wood from soaking by spilled beverage. The aforementioned PCB covers, gutters 718 and paint/coatings/covers together render the arcade 200 highly resistant to the effects of spilled liquid.

Also shown in FIG. 8 is a battery or uninterruptible power supply (UPS) 802 capable of powering the components of arcade system 200, including processor 716 and AV display 214. UPS 802 can also be communicatively connected to processor 716 to provide information regarding power status. Upon loss of external electrical power, as may result from a premises proprietor switching off the premises power, UPS 802 can signal processor 716 to begin a shutdown phase, which can include providing a message on display 214 signaling to players that any game in progress will soon terminate. After a game termination countdown, for example, processor 716 can safely enter and complete its shutdown sequence prior to the depletion of UPS power. When power is returned, battery 802 sends messages to display 214 and processor 716 that can power-up these devices and start up the arcade system 200.

FIG. 9B additionally illustrates how beverage receptacles 220 can be mounted to the underside of panel 208 via mounting brackets, such that they are held up from underneath rather than resting down from above. The holes in panel into which receptacles 220 fit can be made to be a tolerance diameter larger than the outer diameter of the receptacle cups, such that the receptacles do not rest vertically down upon or lean laterally up against panel 208, as any such contact may distort measurements made by associated beverage sensors that collect force (e.g., weight) readings to ascertain beverage presence and/or beverage level.

Figure 11A:
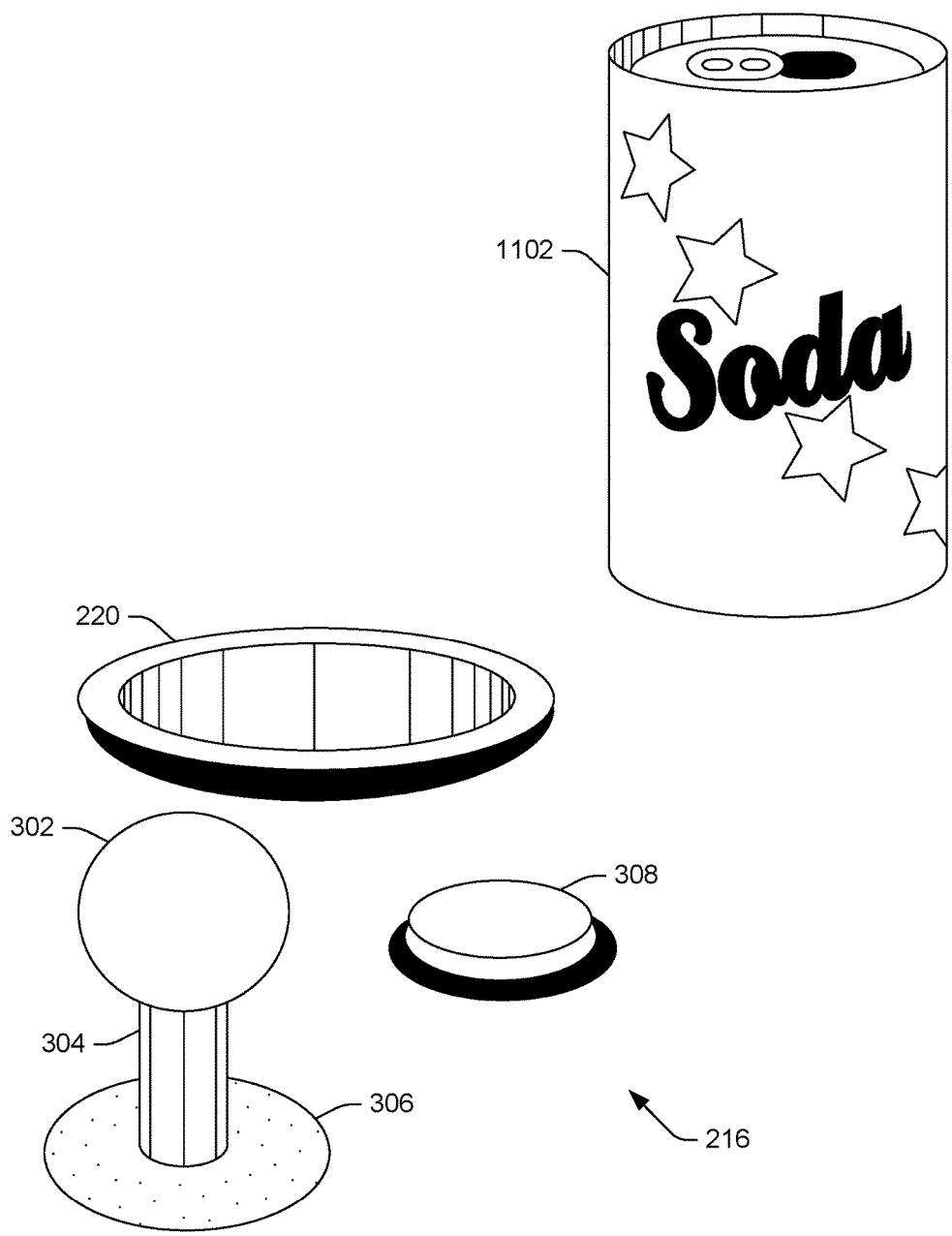
FIG. 11A is a diagrammatic view of an example arcade game control station with sensored beverage receptacle and beverage.
Figure 11B:
FIG. 11B illustrates an example beverage receptacle with example beverage containers.

With reference to FIG. 11A, each station 216 may include a variety of game controls (e.g., joystick 302, 304, 306 and/or one or more buttons 308) and may also include at least one sensored beverage receptacle 220 capable of holding a beverage container (e.g., soda can 1102). With reference to FIG. 11B, beverage receptacle 220 may comprise an ordinary cup holder 254. Beverage receptacle 220 may be so dimensioned as to permit a player to deposit a variety of typical beverages into receptacle 220 such as, without limitation, a beer bottle 1106, a water bottle (not shown), a soda bottle (not shown), a soda can (1102), and/or a drinking glass 1104 such as beer or water glass.

Each beverage receptacle has associated with it one or more beverage sensors. Beverage sensors may comprise a variety of sensors, including load cells and optical cells. Suitable load cells may be selected from, for example, strain gauges such as shear beam strain gauges, S-beam strain gauges, compression load cells, and piezoelectric load cells. A wide variety of load cells, many not explicitly enumerated here, could be used as beverage sensors.

Figure 12A:
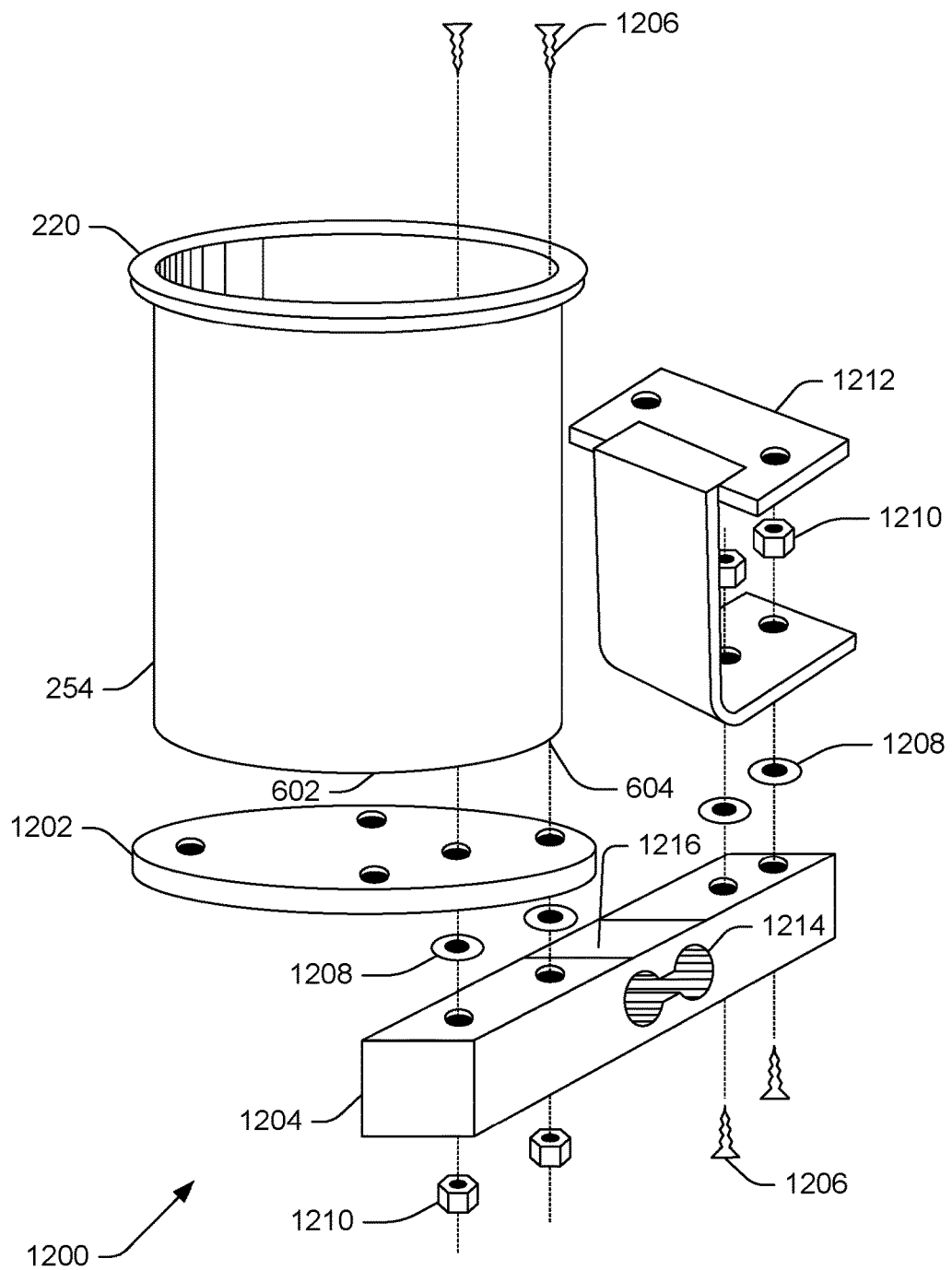
FIG. 12A is an exploded view of components of an example sensored beverage receptacle.

FIG. 12A shows an exploded view of components of an example sensored beverage receptacle 1200. The illustrated sensored beverage receptacle 1200 includes, in addition to cup receptacle 220, a bar load cell 1204 that uses strain gauges to detect beverage weight. Receptacle 220 can be attached to one end of bar load cell 1204 using, for example, threaded bolts 1206, washers 1208 and nuts 1210. The bolts 1206 can be fitted through receptacle attachment points 604, which are labeled, but not visible, in FIG. 12A, on the underside of receptacle cup 254. In some examples, the components can be adhered together using an epoxy or other adhesive, obviating the need for holes drilled through receptacle cup 254, as well as for bolts 1206 and nuts 1210. Washers can adjust mounting space and also serve as a buffer to protect bar load cell 1204, which can be fragile. Mounting bracket 1212 can be bolted or adhered by its bottom to an opposite end of bar load cell 1204, while the top of mounting bracket 1212 can be bolted or adhered to the underside of control panel 208 (not shown in FIG. 12A, but see FIG. 9B). In this manner, receptacle 220 can be prevented from directly contacting panel 208, and thus receptacle 220, and by extension any beverage placed therein, can be mechanically isolated from the rest of arcade game system 200 except through load cell 1204.

Bar load cell 1204 can have four strain gauges connected in a Wheatstone bridge formation. The strain gauges can be bonded to the load cell 1204, positioned, for example, at the middle top and bottom of the load cell 1204, i.e., at position 1216 and the corresponding underside of load cell 1204, such that two strain gauges are in compression at the same time two are in tension when load cell deforms around shaped hole 1214 due to the weight of a beverage. Bar load cell 1204 is laid out in a "Z" formation so that when torque is applied to the bar, the four strain gauges on the cell measure the bending distortion. Two of the gauges measure compression and the other two measure tension caused by a player's drink (bottle, glass, can, etc.) being placed inside cup holder 254.

A millivolt-scale output voltage signal produced in response to the applied force can be amplified and/or otherwise conditioned, modulated, inverted, or converted from analog to digital prior to being provided to a video game controller. In one example, the load cell signal produced by bar load cell 1204 is provided to an amplifier (not shown) and then to a PCB 714 for digitization prior to being fed to processor 716. Small changes in resistance measured from the strain gauges act as an input device for each player to system 200. System 200 therefore permits players to use their drinks to enter a game, provide feedback to the game, affect gameplay, and exit the game. At any time during a game, players' drinks might be measured, therefore the scale formed by sensor 1200 can constantly act as an input in the game in the same manner as a button or joystick. In addition to being used during gameplay, the incorporation of drink sensors into an arcade eliminates the need for more traditional payment methods like coins, bills, payment cards, stored-value cards or reprogrammable magnetic stripe cards.

Measurements using strain gauges may be improved by stiffening the base, or bottom, of the beverage receptacle 220. Accordingly, sensored beverage receptacle 1200 can include a rigid base plate 1202 made from a suitably stiff material such as aluminum or steel. Inclusion of base plate 1202 may be especially advantageous when the beverage receptacle 220 is fabricated from pliable materials such as some thin polyolefin plastics. In such examples, a base plate 1202 is affixed to the beverage receptacle 220. In other examples (not illustrated), the base of the beverage receptacle 220 is sufficiently stiff for making measurements with strain gauges without modification. According to such examples, the base plate is regarded to be unitary with the beverage receptacle 220 and forms its base. Accordingly, all examples that include strain gauges also include base plates regardless of whether the base plate is affixed to or unitary with the beverage receptacle 220, regardless of the material from which the base plate is constructed, and regardless of whether it is constructed from the same or different material as the beverage receptacle 220.

Figure 12B:
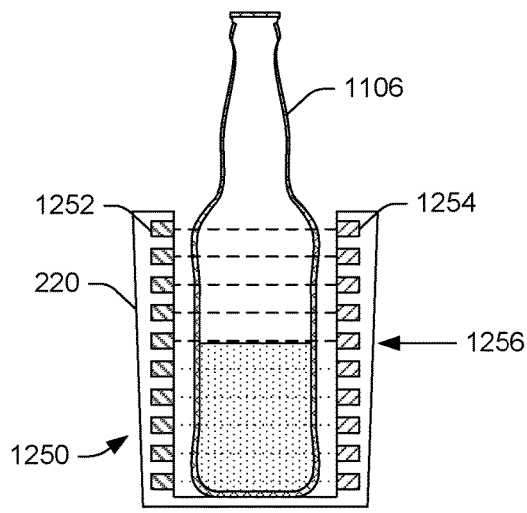
FIGS. 12B-E are cross-section views of example sensored beverage receptacles.

As illustrated in FIGS. 12B-12E, a variety of other beverage sensors may be used in addition to or as an alternative to the load cell arrangement illustrated in FIG. 12A and described above. In the beverage sensor 1250 of cross-section FIG. 12B, a sensor comprising a plurality of vertically offset optical beam break cells is integrated into receptacle 220. More generally, a beverage sensor can include any number of optical cells each having an emitter 1252 and a receiver 1254. Suitable optical cells may situate the emitter and receiver either side-by-side, thus sensing reflection (reflection mode), or, as shown in FIG. 12B, at 180° (transmission mode). In either configuration, the cell can be adapted to sense an occupied state when an optical beam is broken or attenuated above a threshold, which can be a predetermined or an adaptively determined threshold and an unoccupied (empty) state when the beam is unbroken or not attenuated above the threshold. When the optical cells are arranged, as shown, as a plurality of vertically offset optical beam break cells, the combination of output signals is able to determine a level 1256 of beverage, to within the resolution provided by the number of cells, greater resolution being achievable by increasing the number of cells and adjusting their offsets accordingly.

Suitable optical cells may operate in the visible spectrum, or instead may operate in the near infrared spectrum. The output signal of an optical cell may require amplification and/or conditioning. Similar to the case with load cells, while it may be said herein that a controller receives a signal from a beverage sensor, the signal may not necessarily be received by processor 716 directly but rather may be communicated to the controller 716 after being amplified and possibly otherwise conditioned, modulated, inverted, or converted from analog to digital.

The cross-section of FIG. 12B shows a beverage sensor 1260 comprising a combined emitter/receiver optical cell 1262 integrated at the bottom of receptacle 220, to operate in reflection mode and thereby to detect a level 1256 of a beverage inserted into receptacle 220. Beverage sensors 1250, 1262 function better with beverage containers that are more transparent and may not function at all with opaque or reflective containers such as metal cans. Those business establishments that serve beverages only in clear glass containers may benefit most from the sensors 1250 and 1260 illustrated in FIGS. 12B and 12C.

Figure 12C:
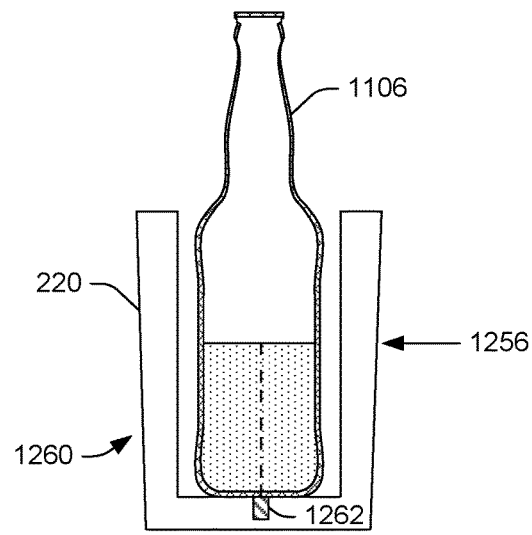
Figure 12D:
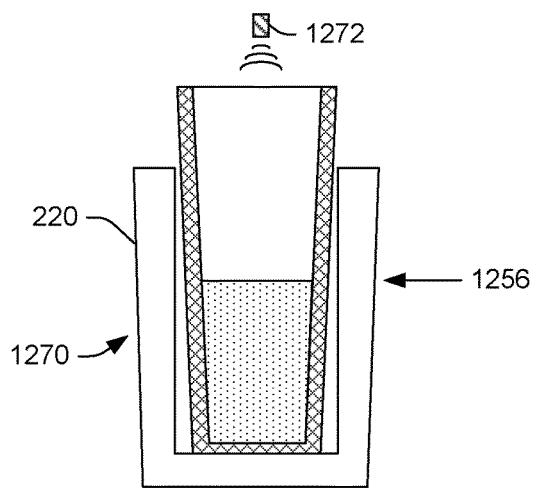

The cross-section of FIG. 12D illustrates a beverage sensor 1270 in which an acoustic emitter/receiver pair is mounted and positioned above corresponding receptacle 220 so as to detect beverage level 1256 using echo ranging through which emitted acoustic signals are reflected from the surface of the liquid beverage. Sensor 1270 may be more effective with wider-mouth glasses and less effective with cans and bottles. However, some example systems may provide a side-loaded beverage receptacle which may have the advantage of enhanced precision positioning of downward-facing sensor emitters vis-à-vis beverage container openings, permitting sensor 1270 to function well with various types of beverage containers. Instead of or in addition to an ultrasonic sensor, sensor 1272 may be, in some examples, a temperature sensor (e.g., an infrared temperature sensor) to sense the temperature of a beverage so as to accept only beverages within certain temperature ranges and thereby reject beverages that are, for example, approximately room temperature, which have presumptively been brought in from outside the business premises rather than sold or otherwise provided by the business. In some examples, an optical beam sensor as illustrated in FIG. 12C may also be placed above the beverage as shown in FIG. 12D to detect beverage level 1256.

Figure 12E:
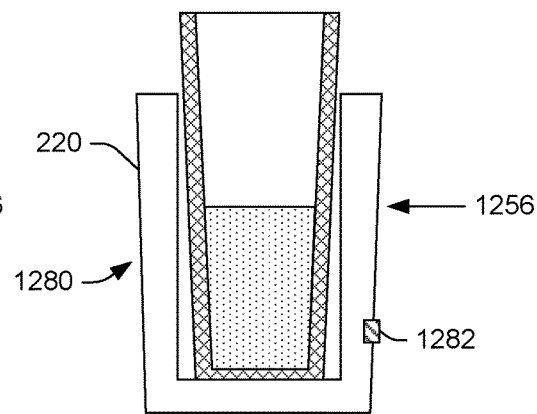

The cross-section of FIG. 12E shows beverage sensor 1280 in which a vibration sensor 1282 is integrated into receptacle 220 to estimate beverage level through the measurement of vibrational energy. A vibrational force is provided to receptacle and beverage 220 and a vibrational response is measured, e.g., by a MEMS accelerometer in sensor 1282. The vibrational force can be provided by a vibrator integrated into unit 1282 or by a separate vibrator. Based on the damping of the response with respect to the force applied, an estimate of mass, and therefore of beverage amount, can be output by sensor 1280.

Although not illustrated, acoustic sensing modalities may also be used for detecting the presence or absence of a container, and the liquid level of the container, based upon the container's properties as a Helmholtz resonator. Also not illustrated, the beverage sensor can incorporate an optical scanner or barcode reader to determine the brand, type, origin, or price of a receptacle-inserted beverage by, for example, scanning a barcode or viewing a container label, and comparing the received input to a database.

Examples may combine load cells and other beverage sensing modalities such as optical cells or scanners into a single beverage sensor unit, for instance, to compensate for shortcomings in one or more of the modalities. For example, combined-sensor units may be used to redundantly detect the presence or absence of non-empty beverage container, thereby providing further assurance of accuracy. A load cell can be especially appropriate for determining that a suitable container is present, while an optical cell can be especially suitable for determining the liquid level of the container.

In some examples, the beverage sensor may be as simple as a switch. However, a the binary output of a switch (weight/no weight) cannot readily be used to measure beverage levels, to distinguish an empty beverage container from a non-empty beverage container, or to distinguish a beverage container from a non-beverage container (e.g., a mobile phone). As such, a switch is not useful to prevent a player from "cheating" by attempting to check-in to a game without having purchased a beverage.

Processor 716 can validate (i.e., judge the legitimacy of) a beverage container and make estimates of the emptiness or non-emptiness of a valid container based on inputs from the one or more beverage sensors, e.g., weight inputs delivered from bar sensors 1204, and by comparing received weight inputs against predetermined thresholds or weight ranges stored in memory of processor 716. For example, a full 20-oz. beer glass of the size typically used for service of draft beverages at bars weighs approximately 800 grams, whereas a full beer bottle (where the bottle is made of glass) weighs approximately 575 grams. Thus, any full beverage inserted into a receptacle 220 of the arcade 200 that is determined to weigh more than approximately 600 grams but less than approximately 800 grams can be deemed to be a beverage served in a glass. Likewise, when system 200 is programmed to understand that no valid drink will be more than about 800 grams in weight, 800 grams can serve as an upper-limit threshold, and any higher weight sensed by a beverage sensor will fail to register as a check-in to play a game.

Full beverage cans and plastic bottles in various sizes can weigh much less than full glasses or glass bottles, but even so can have fairly uniform weights, both when full and when empty. Going under the presumption that a deposited beverage will be a fresh one from which a significant amount of liquid has not already been consumed (e.g., not more than a sip or two), the system 200 may determine that the weight of a deposited beverage falls within one of a variety of predefined ranges corresponding to a variety of anticipated container types and may thus classify the deposited beverage as being, e.g., full 12-oz. soda can or a full 20-oz. plastic soda bottle, and thereby permit check-in, or, conversely, as being, e.g., an empty 12-oz. soda can or an empty 20-oz. plastic soda bottle, and thereby deny check-in or continued play.

As another example, given than an empty beer bottle is approximately 225 grams, if a beverage sensor reports a weight of 225 grams, processor 716 may determine that the deposited object is most likely an empty bottle or a foreign object and thereby system 200 may decline to "check-in" the player or let the player continue to play. Under any refusal condition as determined by processor 716, a warning may be delivered to a player via AV screen 214 alerting the player of the need to purchase a new drink if the player desires to join or continue gameplay.

The programming for arcade system 200 can be customized for the restaurant or bar establishment in which the system 200 is installed. For example, some bars do not serve beverages in cans at all, while others serve beverages only in glasses and do not serve bottles. In such instances, the system 200 can be informed with such information by setting customization settings, allowing system 200 to make more accurate or more certain estimates of beverage levels or determinations of beverage legitimacy, e.g., by eliminating a variety of possibilities from among the various preprogrammed identifier ranges as discussed above. System 200 can similarly be programmed, again via customization parameter settings, to know the weight or weight range of a standard glass or set of glasses if the establishment serves all its beverages in only one or a few standardized glasses.

Processor 716 can be connected to the Internet or other computer network wired (e.g., through Ethernet) or wirelessly (e.g., over a WiFi connection or cellular modem connected by USB to the processor 716) and can thereby report collected usage data, e.g., to a central server, by e-mail, FTP, SCP, HTTP, or another protocol. Such usage data can be analyzed by business proprietors, in some instances after being merged with or mapped to sales receipt data, to understand customer preferences and behavior and thereby to inform business decisions, such as what brands of beverages to stock, when to sell certain beverages at discount, what operating hours to keep, and whether to install additional arcade machines of the type described herein.

In summary, this disclosure provides a device comprising a beverage receptacle adapted to hold a beverage container in an upright orientation; a beverage sensor operatively coupled to the beverage receptacle and adapted to distinguishably respond to states of the beverage receptacle including empty, non-empty but containing an empty beverage container, and non-empty and containing a non-empty beverage container; and an output of the beverage sensor adapted to electronically communicate responses of the beverage sensor to an input of a video game controller. The device can further comprise a rigid base plate disposed at a bottom of the beverage receptacle. The beverage sensor can comprise a load cell operatively affixed to the base plate and adapted to sense vertically applied forces incident upon the beverage receptacle.

The base plate can be unitary with the beverage receptacle, or the base plate can be a separate structure affixed to the bottom of the beverage receptacle. The load cell can, for example, be selected from one or more of a shear beam strain gauge, an S-beam strain gauge, a compression load cell, or a piezoelectric load cell. The video game controller can be adapted to enable and disable a character of the video game in response to input from the beverage sensor. The video game controller can be adapted to disable the character of the video game when the beverage receptacle is empty and/or when a beverage container received by the beverage receptacle is empty. As an example, the video game controller can be adapted to disable the character of the video game when the beverage receptacle receives between 8 ounces and 0 ounces of vertically applied force.

Additionally or alternatively to the beverage sensor comprising a load cell, the beverage sensor can comprise an optical beam break cell or a plurality of vertically offset optical beam break cells. Additionally or alternatively, the beverage sensor can comprise a Helmholtz resonator volume sensing device.

The video game controller can be adapted to temporarily disable the character of the video game while the video game controller is receiving a signal from the beverage sensor indicating that the beverage receptacle is receiving a non-empty beverage container. The character can remain disabled until the video game controller receives a first signal from the beverage sensor indicating that the beverage receptacle is empty, followed by a second signal from the beverage sensor indicating that the beverage receptacle is receiving a non-empty beverage container.

The video game controller can be adapted to disable the character of the video game when the beverage sensor indicates that no beverage container is present in the beverage receptacle, or when the beverage sensor indicates that an empty beverage container is present in the beverage receptacle. The video game controller can be adapted to enable the character of the video game when the beverage sensor indicates that a non-empty beverage container is present in the beverage receptacle. The video game controller can be adapted to temporarily disable the character of the video game while the video game controller is receiving a signal from the beverage sensor indicating that the beverage receptacle is receiving a non-empty beverage container.

The video game controller can be further adapted maintain the character in a disabled state until the video game controller receives a first signal from the beverage sensor indicating that the beverage receptacle is empty, followed by a second signal from the beverage sensor indicating that the beverage receptacle is receiving a non-empty beverage container.

Figure 13A:
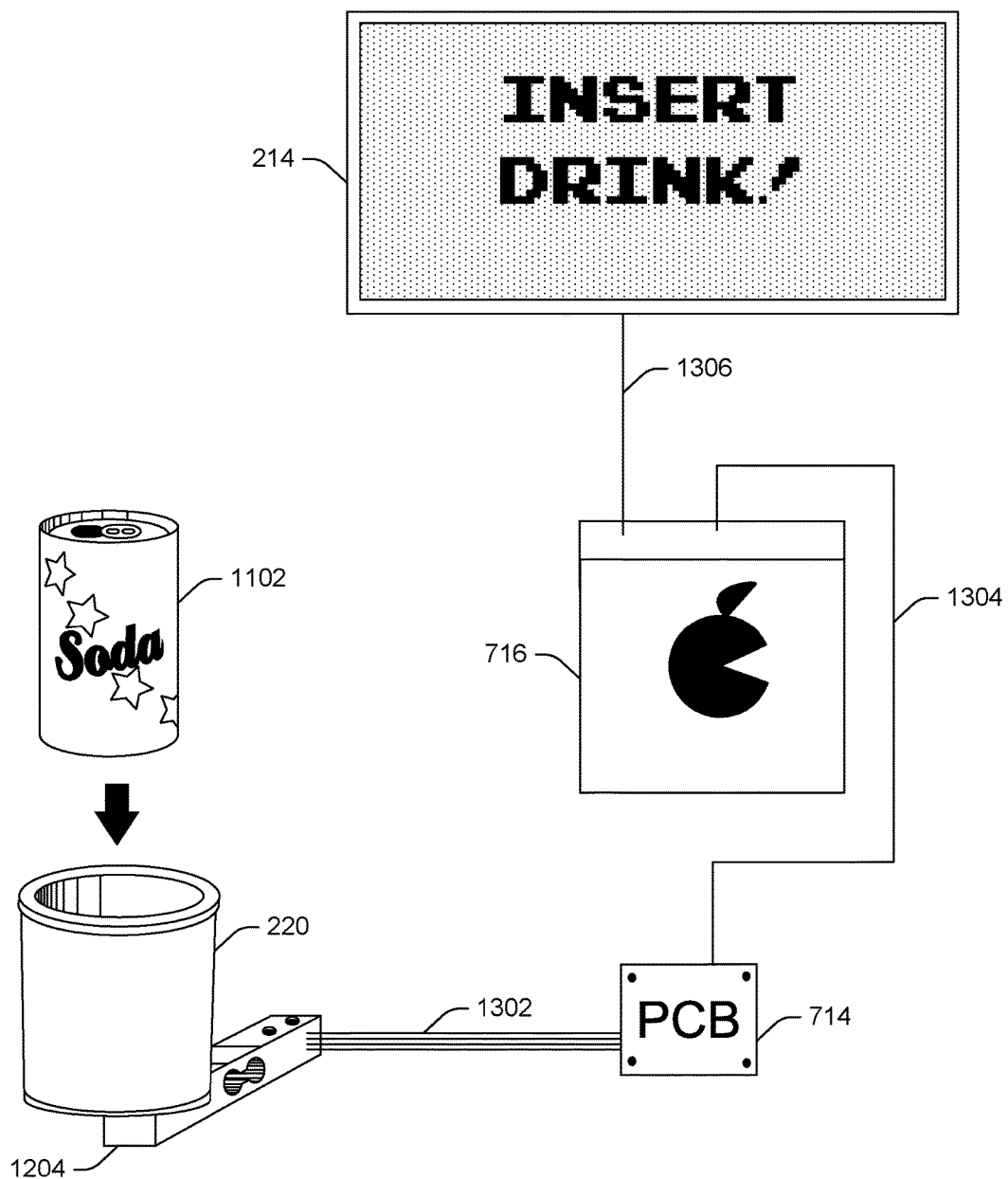
FIGS. 13A-G are a sequence of diagrams illustrating an example method of use of an arcade game system having a sensored beverage receptacle.

FIGS. 13A-G illustrate, using a sequence of diagrams, an example method of use of a system such as arcade 200 including various prompts delivered to user by the system via display 214 at various times and various player actions responsive to those prompts or vice-versa. FIG. 13A shows the check-in process whereby processor 716 generates a prompt sent to display 214 over AV link 1306 (e.g., HDMI cable) and a player can thereby be prompted to insert a drink. Responsive to the prompt, the player can insert a drink, e.g., soda can 1102, into beverage receptacle 220 having an associated beverage sensor, e.g., bar load cell 1204. A signal from the sensor corresponding to a beverage property, e.g., a measured weight, can be transmitted to processor 716, e.g., through the intermediary of PCB 714 over analog transmission wires 1302 and USB connection 1304.

Figure 13B:
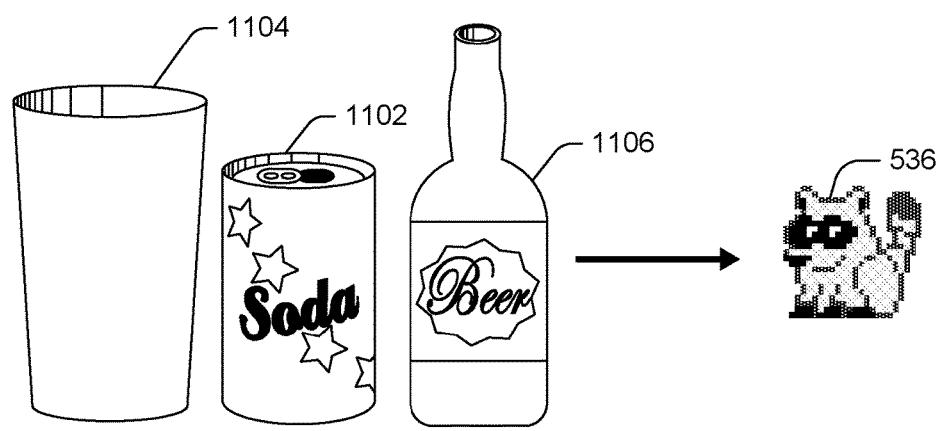

FIG. 13B is representative of the fact that the deposit of a non-empty bottle 1106, can 1102, or cup 1104 into sensored beverage receptacle can serve as an entry to the game by enabling control of a character 536, in similar fashion to the way that the deposit of a coin (e.g., quarter) or token activates gameplay in a traditional arcade machine.

Figure 13C:
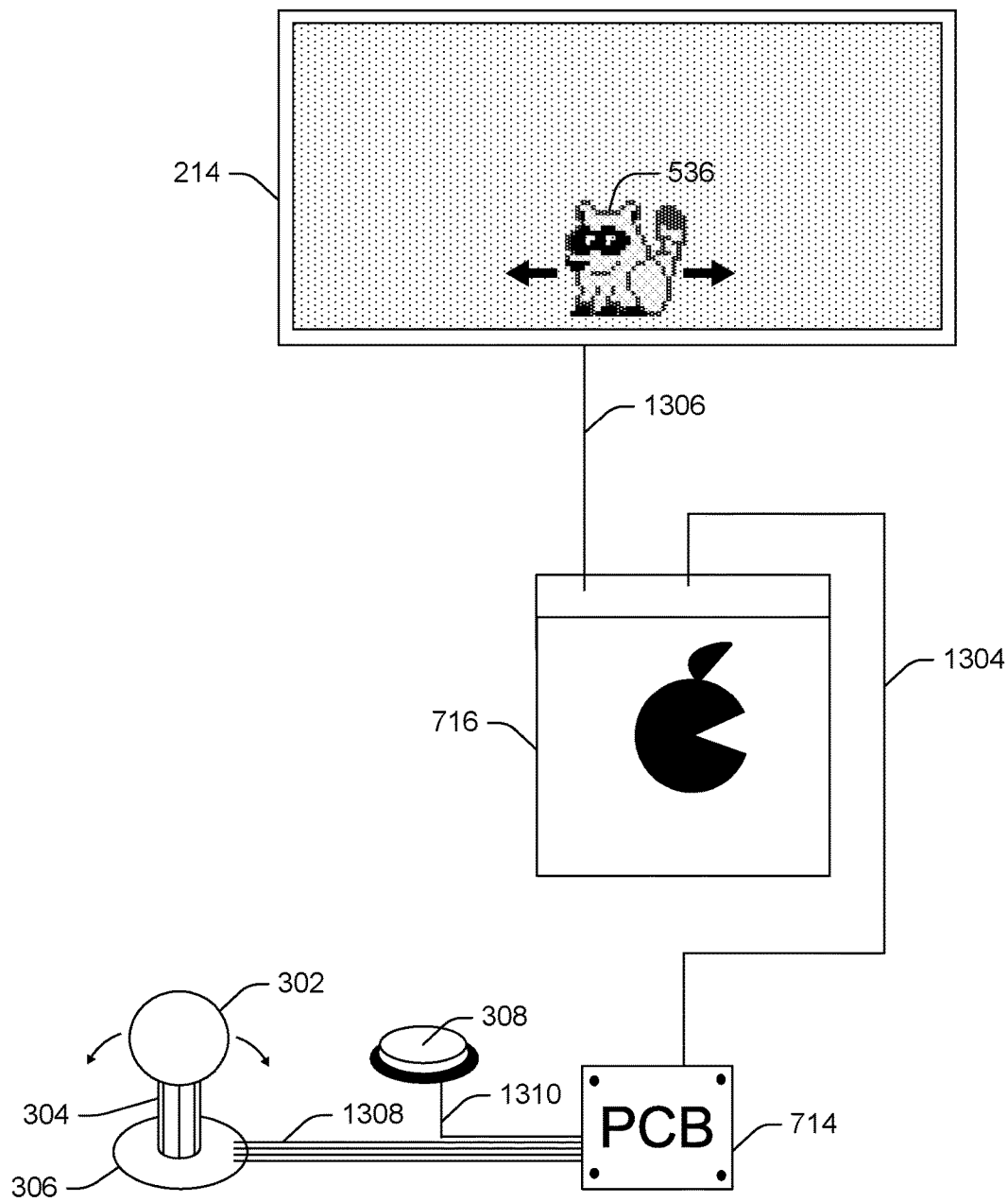
Figure 13D:
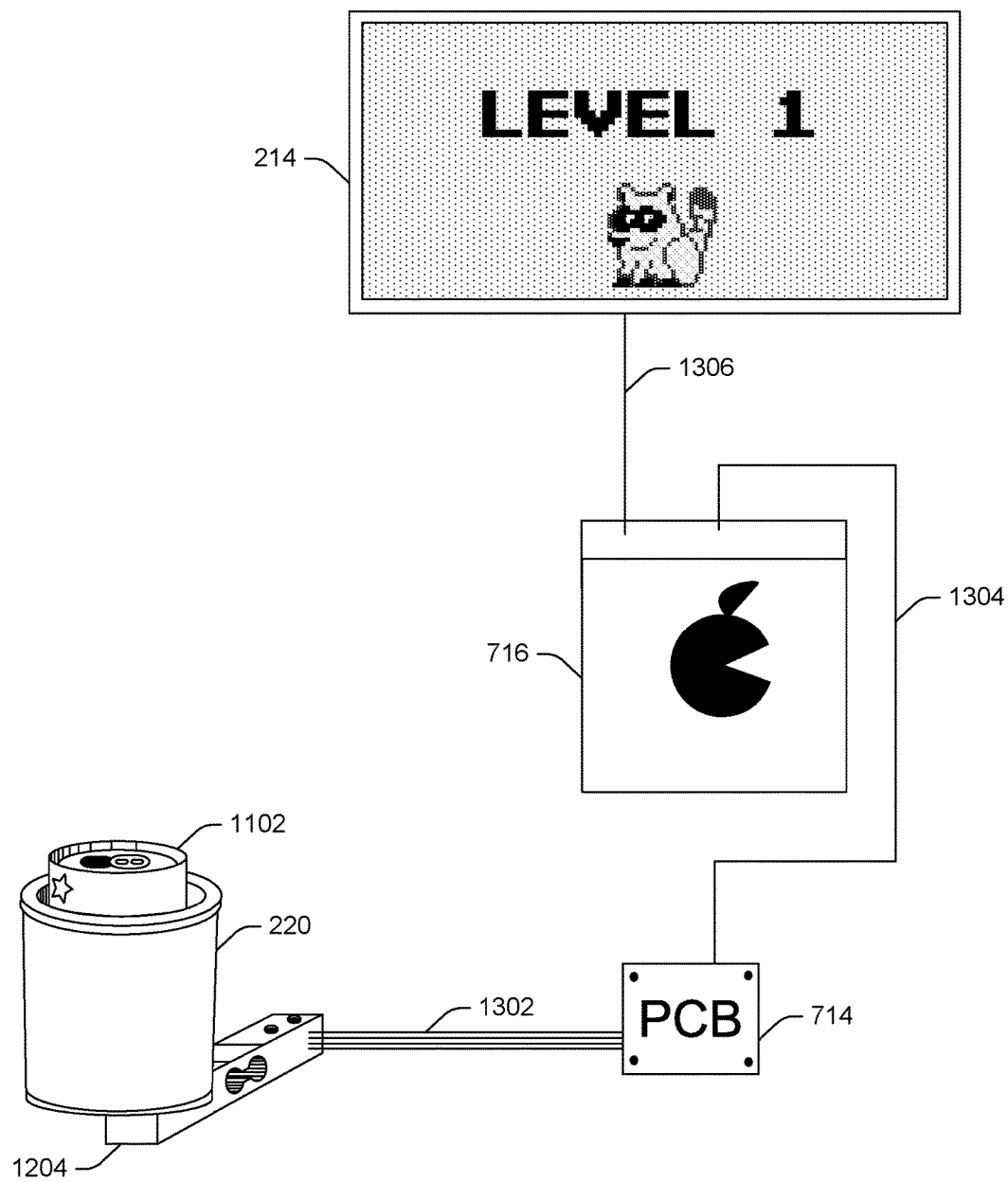
Figure 13E:
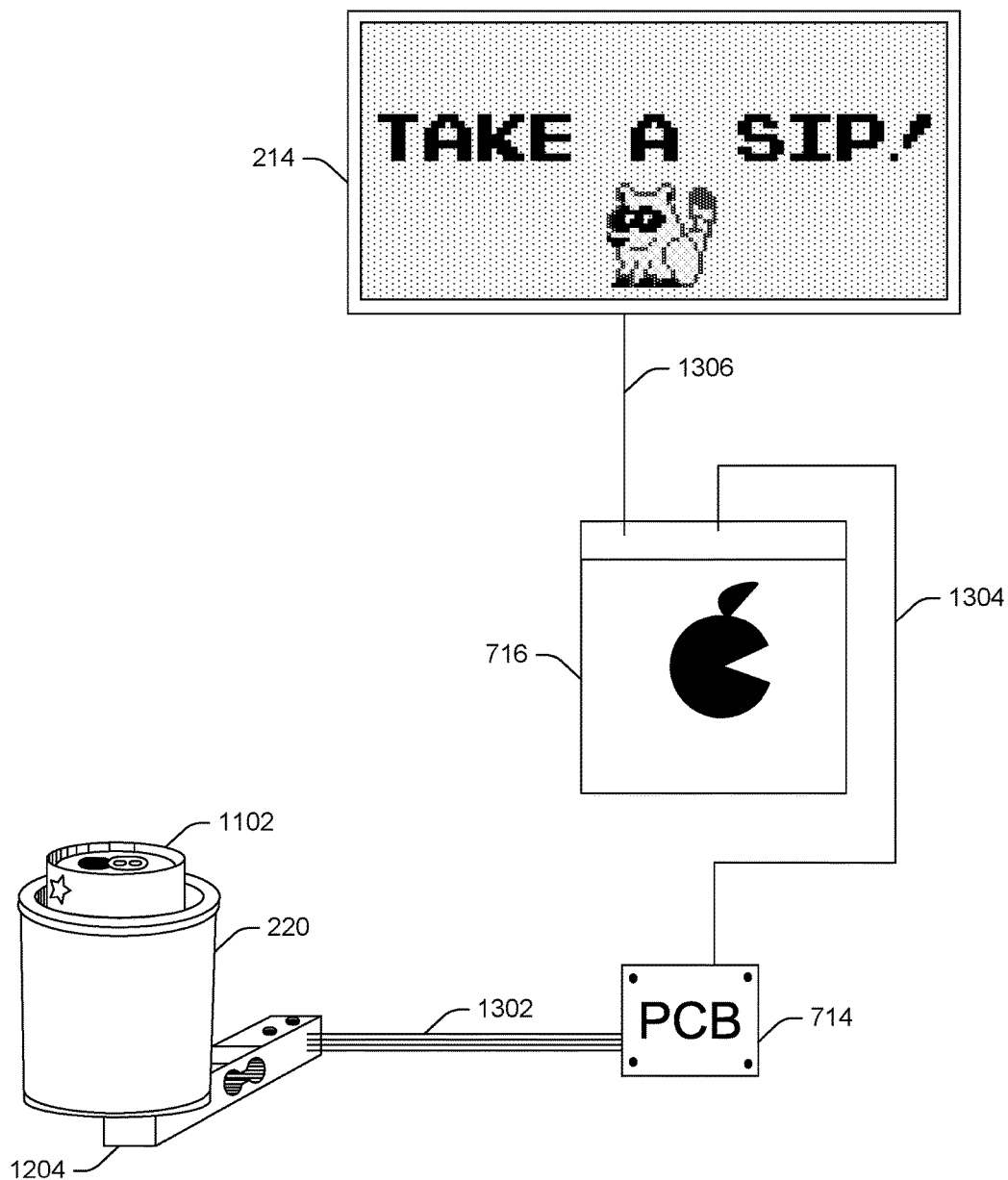

Now checked-in through the deposit of valid beverage container, FIG. 13C illustrates that the player can manipulate the character 536 using other control inputs, such as joystick 302/304/306 and button 308. Joystick 302/304/306 may be connected to PCB 714 via, e.g., four analog connections 1308 (one of each of four pressure switches associated with joystick 302/304/306) while button 308 (having only one pressure switch associated therewith) may be connected to PCB 714 via only a single analog connection 1310. As before, PCB may digitize inputs and deliver control signals to processor 716 via connection 1304, e.g., a USB connection. As an example of character control, moving joystick 302/304/306 left and right can move character 536 left and right, respectively, on screen 214. The game begins in FIG. 13D ("Level 1"), during which the container 1102 used to check in can be required to remain, at least for a substantial portion of the gameplay time, in receptacle 220. For example, a removal of a beverage container for a predetermined timeout limit (e.g., 10 straight seconds) may be indicative that the player has left the game and may deactivate the player's movement. As another example, removal of the beverage for a predetermined fraction of gameplay time (e.g., more than 10% of elapsed gameplay time) may similarly trigger a deactivation, which deactivation may be permanent for the duration of the game, level, or round, or may be only temporary until the beverage container or a fresh beverage has been replaced into sensored receptacle 220. During gameplay, the player can move corresponding character 536 around on screen 214 to compete until the player is prompted to take a sip, as shown in FIG. 13E.

Figure 13F:
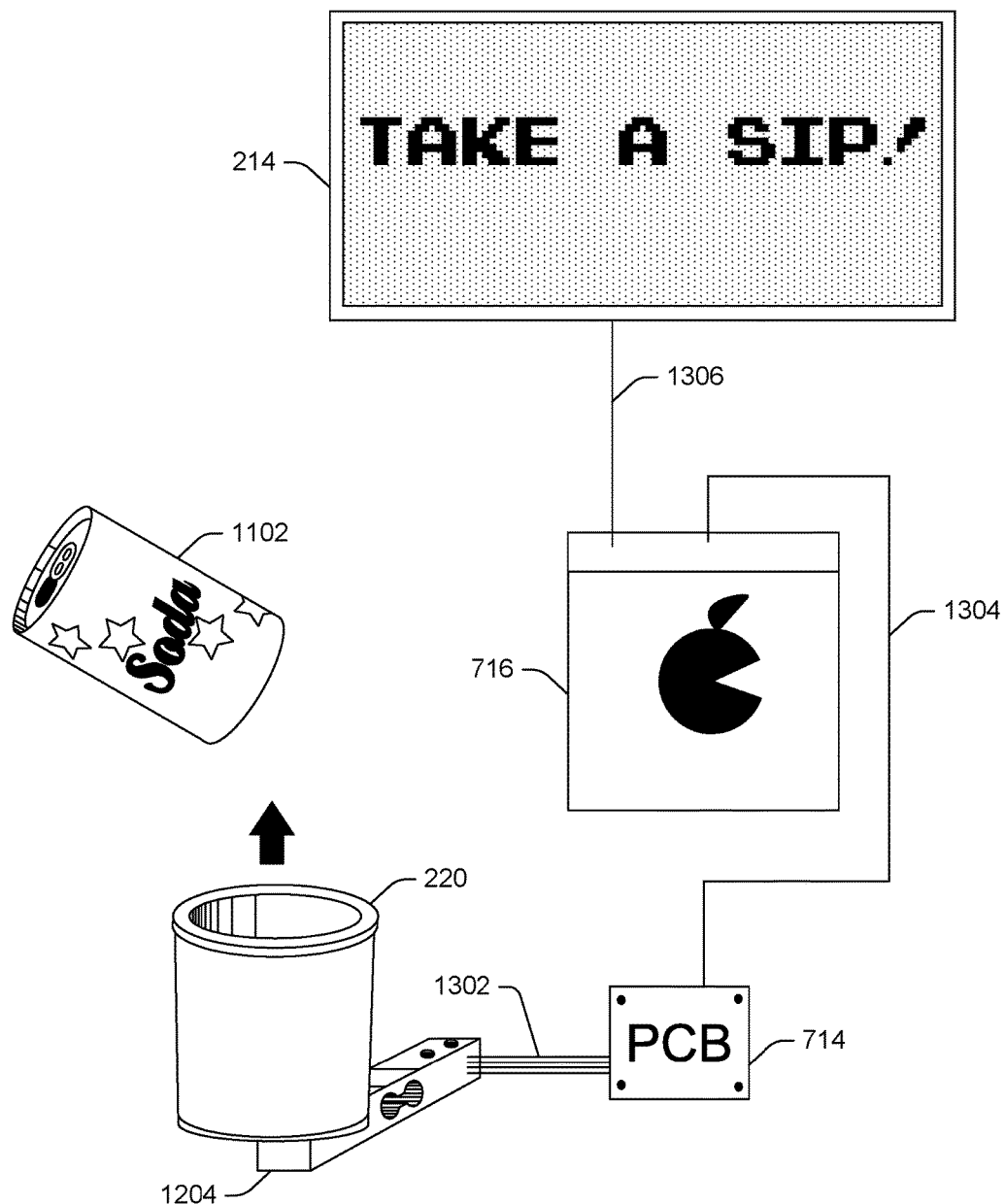
Figure 13G:
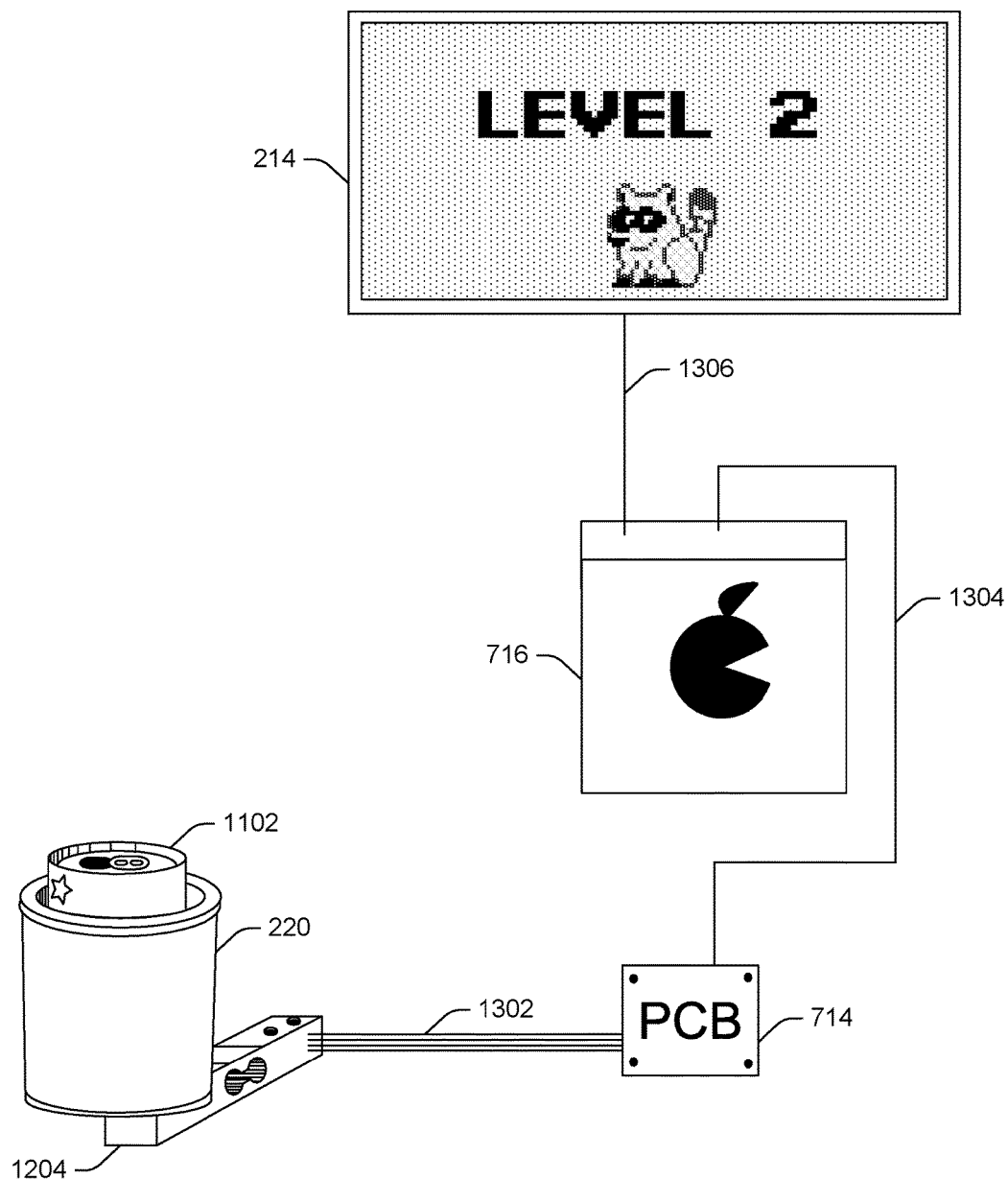

As shown in FIG. 13F, upon such a prompt, the player can be required to at least remove and replace container 1102 from receptacle 220, and, in some examples, may be required to reduce the weight of the container by an amount falling within a predetermined range corresponding to, e.g., a single sip (e.g., between 5 and 20 grams, the average sip size being approximately 12 grams). Having completed the required sip (or motion of a sip if an actual sip is not required), the game can resume, as shown in FIG. 13G (beginning "Level 2").

Figure 14:
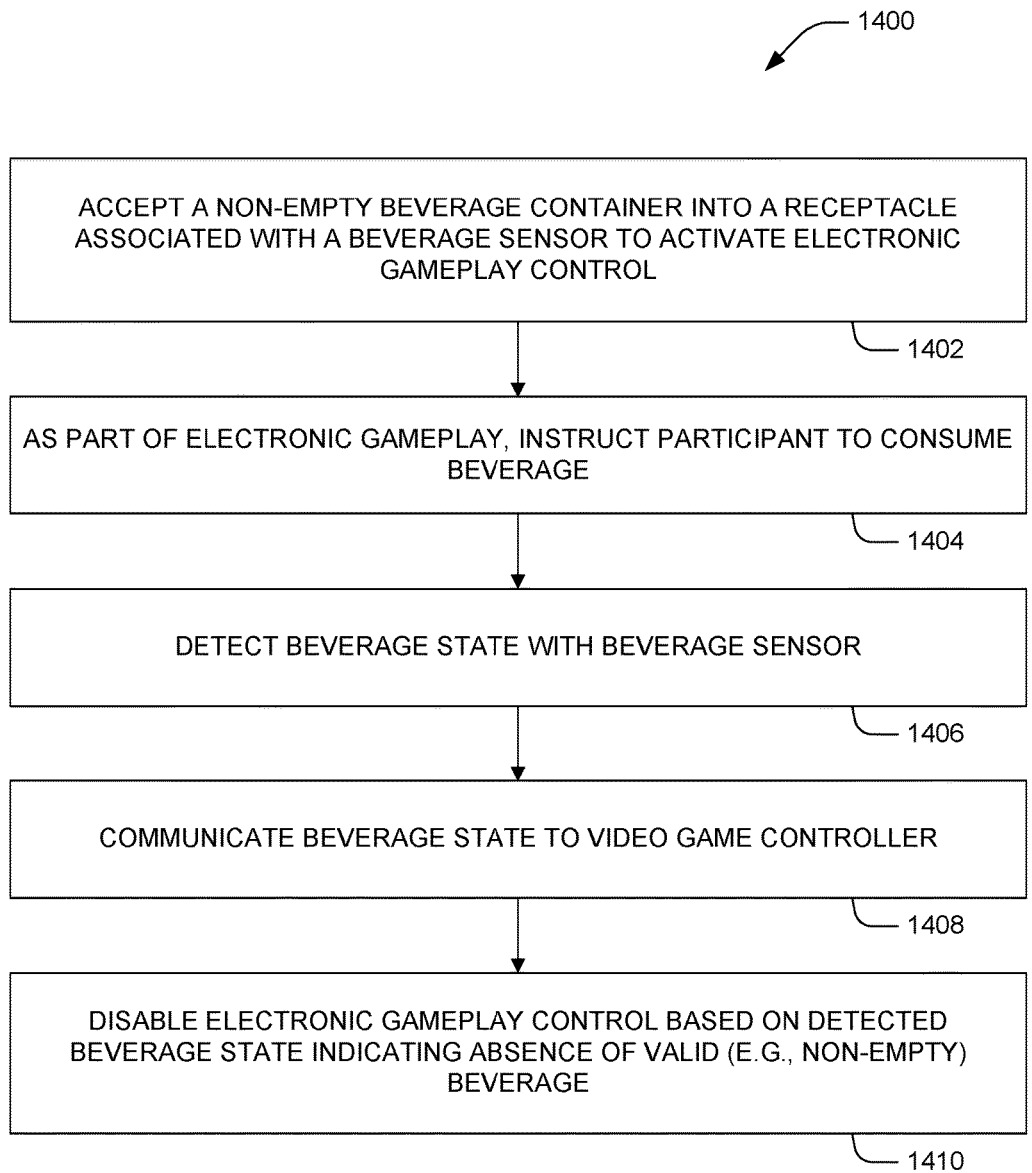
FIG. 14 is a flow chart illustrating an example method of use of an arcade game system having a sensored beverage receptacle.

In accordance with the above, a method 1400 of gameplay using a video game machine with an integrated beverage sensor is illustrated in FIG. 14. The method can begin with a check-in process by accepting a non-empty beverage container into a receptacle associated with a beverage sensor to activate 1402 electronic gameplay control. The beverage can be validated through one or more sensed or measured beverage parameters, such as weight, level, barcode, or temperature based on beverage sensor input, to prevent invalid check-in. The method can continue with instructing 1404 a participant to consume beverage as part of gameplay, e.g., upon losing a game or level. One or more beverage states (e.g., beverage weight, beverage temperature, beverage volume, beverage level) can be detected 1406 with a beverage sensor, and the detected beverage state(s) can be communicated 1408 to a video game controller (e.g., processor 716). Electronic gameplay control can be disabled 1410 based on detected beverage state indicating absence of valid beverage, and in some examples can be re-enabled based on detected beverage state indicating presence of a valid beverage again.

In some examples, player controls are not used to control an onscreen character, but instead are used to play an arcade game in some other fashion (e.g., first-person-perspective racing games and shooting games) or to provide other competitive inputs (e.g., selecting among multiple choice quiz or estimation questions). In such examples, however, the operation of the game and the methods described above need not be otherwise different than as described above.

In addition to obviating the need for coins and tokens to activate gameplay, the systems and methods described herein may also obviate the need for scorekeeping within a game as a means of incentivizing competitive gameplay. This is because the "shame of losing game"—i.e., of drinking upon a loss—may eliminate the need for a high score in incentivizing or motivating players. Thus, in some examples, no score is kept throughout the game, as a traditional tally of points or otherwise. In other examples, even if no traditional point tally is kept, statistics as to the number of times each player was caused to take a sip, and/or the amount of beverage consumed by the various players over the course of gameplay or other statistics, may be compiled and reported at the end of gameplay or periodically throughout gameplay (e.g., at the end of various levels or rounds and/or as a persistent on-screen display). In some instances, players can be called upon to register guesses (through game inputs) as to who among them had to drink the most, or who most recently took the biggest gulp, for example. In some examples, the more that a player has consumed over the course of a game, the more that player is rewarded, e.g., with ability upgrades to characters, which may compensate for reduced gameplay performance that may be owed to the physiological effects of consuming alcohol.

Figure 15:
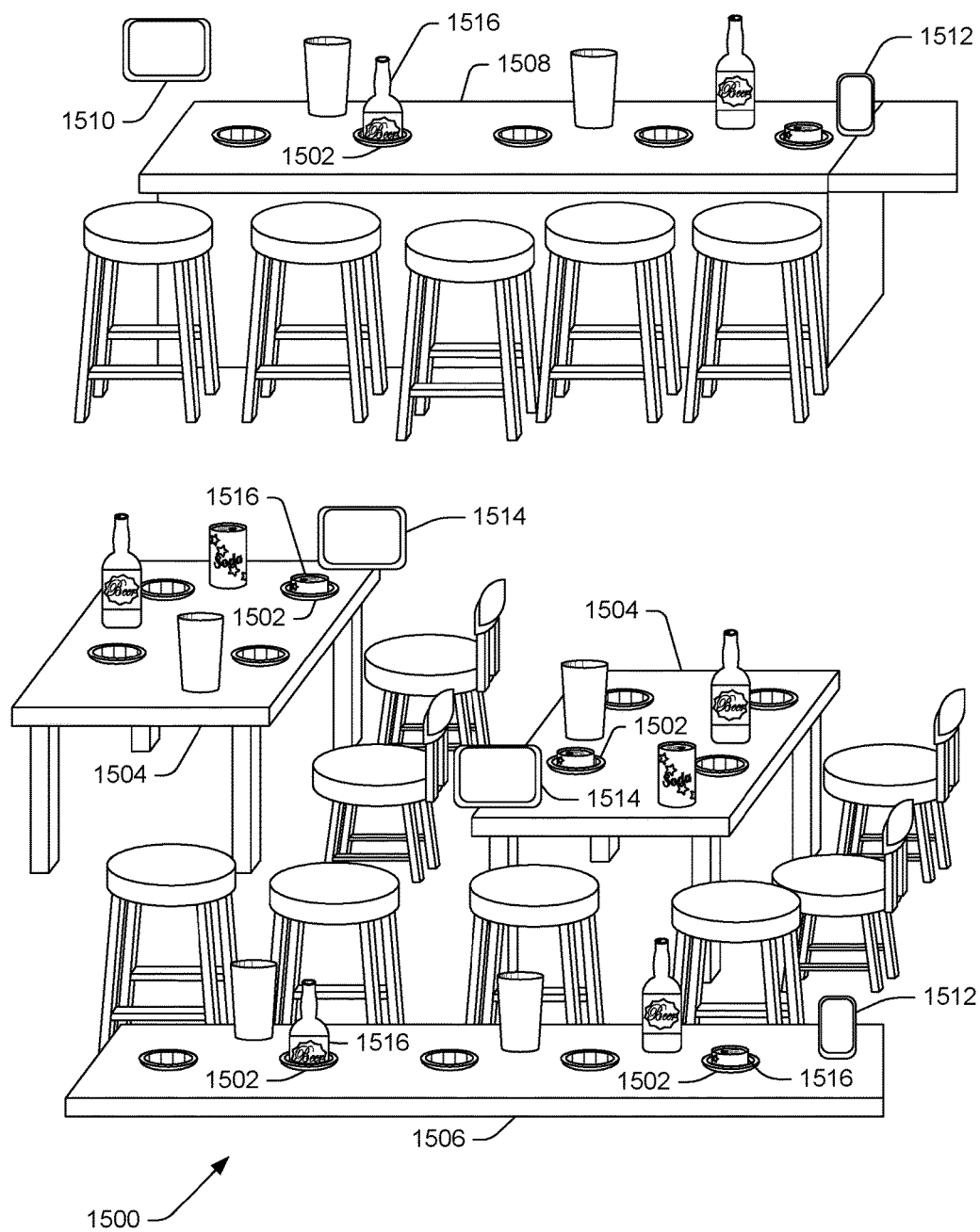
FIG. 15 is an illustration of a distributed-premises game system using beverage sensors as game check-ins and/or game inputs.

Some example systems, such as system 1500 illustrated in FIG. 15, can operate without a single arcade cabinet but instead can use beverage sensors 1502 of the types described herein mounted to tabletops 1504, counters 1506, bars 1508, and/or shelves in a distributed fashion throughout the premises of a business establishment. The sensors can be wired or wirelessly connected to a central processor, which can be a mobile computing device, such as tablet computer 1510, or can together form a distributed network of processors, in either case capable of supplying inputs to games that would not necessarily involve an arcade machine. For example, a business establishment such as a bar can use system 1500 to administer a bar trivia game (a "pub quiz") consisting of various rounds wherein participants can be required to purchase, and check-in using the above-described methods, a non-empty beverage 1516 to join the game, and/or non-winning participants are called upon to take sips of their respective drinks at various points throughout the game.

In some distributed system examples, beverage sensors can include or be connected to a miniaturized computer system (e.g., a Raspberry Pi or ASUS Tinker) to process beverage measurements and transmit measurements or analyzed data derived therefrom. The miniaturized computer system may transmit the measurements or data over a wireless protocol such as Bluetooth or WiFi.

Participants' personal mobile computing devices (e.g., smartphones 1512 or tablets 1514) can be used to provide electronic player inputs to such a game, and in some examples, the participant personal mobile computing devices 1512, 1514 can be required to be paired with participants' respective beverage sensors 1502 so as to match players' responses or other gameplay inputs entered through, e.g., a mobile app or a web app to each player's corresponding beverage state as measured by players' respective beverage sensors 1502. Participant mobile devices 1512, 1514 can be paired to beverage sensors 1502 by the mobile devices' sensing a proximity signal emitted by the beverage sensors 1502, by the mobile devices 1512, 1514 using a camera or other imaging sensor to visually sense a distinctive marker (e.g., a barcode or a QR code) on or associated with the beverage sensor, or by the participants' manually inputting a station ID into a mobile app or web app. In some examples, players' responses or game inputs may be delivered verbally or by paper or other methods and entered via a computing device 1510 used by a game host or scorekeeper.

With a similar setup, the beverage sensors described herein can further be used as voting mechanisms for communal participatory activities, e.g., to select the winner of an in-establishment competition (e.g., karaoke contest, poetry slam, dance competition) or to gauge support in the establishment for one sporting team or another during a sport match. The voting can be based on number of sips taken in a defined time period or on total volume (or weight) of beverage consumed. Additionally or alternatively, participants' personal mobile devices, linked to their respective beverage sensors, can execute arcade games or other types of games for individual play by participants, wherein the gameplay or results can be linked between participants in a business establishment, permitting for a distributed version of the arcade system 200 without requiring a cabinet or large AV monitor.

Accordingly, the present disclosure describes a system comprising a game server to transmit game content to, and receive game information from, a plurality of wireless mobile devices; a plurality of beverage receptacles each adapted to hold a beverage container in an upright orientation; and a plurality of beverage sensors each associated with one of the beverage receptacles, each of the beverage sensors to distinguish beverage states and to electronically communicate distinguished beverage states to the game server; wherein game content transmitted by the game server to a target wireless mobile device is based on a beverage state distinguished by one of the beverage sensors corresponding to the target wireless mobile device.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

I claim:

1. An arcade game comprising:
one or more processors for executing an arcade game having one or more participants;
a visual display screen; and
a countertop control panel, the countertop control panel comprising:
at least one game input by which a participant can control the arcade game;
at least one beverage receptacle to hold a beverage container in an upright orientation; and
at least one beverage sensor to distinguish one or more beverage states and to communicate the distinguished one or more beverage states to the arcade game as gameplay activation inputs to the arcade game.

2. The arcade game of claim 1, wherein the one or more processors are configured to enable and disable control inputs of a player of the arcade game based on input from the beverage sensor.

3. The arcade game of claim 2, wherein the one or more processors are configured to disable the control inputs of the player of the arcade game when the beverage receptacle is empty and to disable the control inputs of the player of the arcade game when a beverage container received by the beverage receptacle is empty.

4. The arcade game of claim 1, further comprising at least one gutter to convey liquid from the beverage receptacle to a reservoir.

5. A method comprising:
accepting a non-empty beverage container into a receptacle associated with a beverage sensor to activate electronic gameplay control;
as part of electronic gameplay, instructing a participant to consume beverage from the beverage container;

detecting at least one beverage state with the beverage sensor;

communicating the at least one beverage state to a video game controller; and disabling electronic gameplay control for the participant based on the detected beverage state indicating the absence of a non-empty beverage container.

6. A device comprising:

a beverage receptacle adapted to hold a beverage container in an upright orientation;

a beverage sensor operatively coupled to the beverage receptacle and adapted to distinguishably respond to states of the beverage receptacle including empty, non-empty but containing an empty beverage container, and non-empty and containing a non-empty beverage container; and an output of the beverage sensor adapted to electronically communicate responses of the beverage sensor to an input of a video game controller.

7. The device of claim 6, further comprising a rigid base plate disposed at a bottom of the beverage receptacle, wherein the beverage sensor comprises a load cell operatively affixed to the base plate and adapted to sense vertically applied forces incident upon the beverage receptacle.

8. The device of claim 7, wherein the base plate is unitary with the beverage receptacle, or wherein the base plate is a separate structure affixed to the bottom of the beverage receptacle.

9. The device of claim 8, wherein the load cell is selected from one or more of a shear beam strain gauge, an S-beam strain gauge, a compression load cell, or a piezoelectric load cell.

10. The device of claim 6, wherein the video game controller is adapted to enable and disable a player of the video game in response to input from the beverage sensor.

11. The device of claim 10, wherein the video game controller is adapted to disable the player of the video game when the beverage receptacle is empty and when a beverage container received by the beverage receptacle is empty.

12. The device of claim 11, wherein the video game controller is adapted to disable the player of the video game when the beverage receptacle receives between 8 ounces and 0 ounces of vertically applied force.

13. The device of claim 6, wherein the video game controller is adapted to temporarily disable the player of the video game while the video game, controller is receiving a signal from the beverage sensor indicating that the beverage receptacle is receiving a non-empty beverage container.

14. The device of claim 13, wherein the player remains disabled until the video game controller receives a first signal from the beverage sensor indicating that the beverage receptacle is empty, followed by a second signal from the beverage sensor indicating that the beverage receptacle is receiving a non-empty beverage container.

15. The device of claim 6, wherein the beverage sensor comprises an optical beam break cell.

16. The device of claim 15, wherein the beverage sensor comprises a plurality of vertically offset optical beam break cells.

17. The device of claim 15, wherein the video game controller is adapted to disable the player of the video game when the beverage sensor indicates that no beverage container is present in the beverage receptacle, or when the beverage sensor indicates that an empty beverage container is present in the beverage receptacle, and wherein the video game controller is adapted to enable the player of the video game when the beverage sensor indicates that a non-empty beverage container is present in the beverage receptacle.

18. The device of claim 17, wherein the video game controller is adapted to temporarily disable the player of the video game while the video game controller is receiving a signal from the beverage sensor indicating that the beverage receptacle is receiving a non-empty beverage container.

19. The device of claim 18, wherein the video game controller is further adapted maintain the player in a disabled state until the video game controller receives a first signal from the beverage sensor indicating that the beverage receptacle is empty, followed by a second signal from the beverage sensor indicating that the beverage receptacle is receiving a non-empty beverage container.

20. The device of claim 6, wherein the beverage sensor comprises a Helmholtz resonator volume sensing device.

* * * * *